US012568353B2

(12) United States Patent
Wang et al.

(10) Patent No.: US 12,568,353 B2
(45) Date of Patent: Mar. 3, 2026

(54) SWITCH MODULE, TERMINAL DEVICE, METHOD FOR CONTROLLING TERMINAL DEVICE

(71) Applicant: BEIJING XIAOMI MOBILE SOFTWARE CO., LTD., Beijing (CN)

(72) Inventors: Chunjie Wang, Beijing (CN); Honggang Shen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 691 days.

(21) Appl. No.: 17/893,402

(22) Filed: Aug. 23, 2022

(65) Prior Publication Data

US 2023/0345227 A1      Oct. 26, 2023

(30) Foreign Application Priority Data

Apr. 25, 2022    (CN) ......................... 202210442457.2

(51) Int. Cl.
| | |
|---|---|
| *H04W 8/18* | (2009.01) |
| *G06F 13/40* | (2006.01) |
| *H04W 88/06* | (2009.01) |

(52) U.S. Cl.
CPC ........ *H04W 8/183* (2013.01); *G06F 13/4022* (2013.01); *H04W 88/06* (2013.01)

(58) Field of Classification Search
CPC ... H04W 8/183; H04W 88/06; G06F 13/4022; G06F 15/7871
See application file for complete search history.

(56) References Cited

U.S. PATENT DOCUMENTS

| | | | |
|---|---|---|---|
| 8,121,643 B2 * | 2/2012 | Lin .................... | G06K 19/0701 |
| | | | 455/343.1 |
| 8,577,415 B2 * | 11/2013 | Zhao ........................ | H04B 1/48 |
| | | | 455/559 |
| 9,615,232 B2 * | 4/2017 | Bendixen ................ | H04W 8/20 |
| 2014/0179371 A1 | 6/2014 | Ramkumar | |
| 2021/0250430 A1 | 8/2021 | Moon | |

FOREIGN PATENT DOCUMENTS

| | | |
|---|---|---|
| CN | 111654300 A | 9/2020 |
| CN | 112232096 A | 1/2021 |

OTHER PUBLICATIONS

Extended European Search Report issued on May 15, 2023 in European Patent Application No. 22193181.9, 13 pages.

* cited by examiner

*Primary Examiner* — Idriss N Alrobaye
*Assistant Examiner* — Richard B Franklin
(74) *Attorney, Agent, or Firm* — Oblon, McClelland, Maier & Neustadt, L.L.P.

(57) ABSTRACT

A switch module, a terminal device, a method for controlling a terminal device. The switch module includes: a set of first-class pins configured to couple with a processing module; two sets of second-class pins, in which a first set of second-class pins is configured to couple with a first subscriber identification module (SIM) card, and a second set of second-class pins is configured to couple with a second SIM card; a first control pin coupled with a control output pin of the processing module and receive a switching signal; and a switch circuit, coupled with the first control pin, the first-class pills and two sets of second-class pins, in which the switch circuit is configured to turn on a path between the first-class pins and the first set of second-class pins or a path between the first-class pins and the second set of second-class pins according to the switching signal.

19 Claims, 13 Drawing Sheets

| generating a switching signal | S501 |
| reading a configuration file and generating the switching signal according to state information of the first SIM card in the configuration file | S5011 |
| generating the switching signal in response to detecting an operation instruction for the first SIM card or the second SIM card via a user interface (UI) | S5012 | reading the configuration file after the terminal device is powered on          S50113 generating the switching signal according to state information of the first SIM card in the configuration file          S5011 determining the state information of the first SIM card in the configuration file according to an operation instruction for the first SIM card or the second SIM card          S503

SWITCH MODULE, TERMINAL DEVICE, METHOD FOR CONTROLLING TERMINAL DEVICE

CROSS REFERENCE TO RELATED APPLICATION

The disclosure claims a priority to and benefits of Chinese Patent Application No. 2022104424572 filed on Apr. 25, 2022, the contents of which are incorporated herein by reference in their entireties for all purposes.

BACKGROUND OF THE INVENTION

Field of the Invention

The present disclosure relates to a field of communication technologies, and more particularly, to a switch module, a terminal device, a method for controlling.

Description of the Related Art

Embedded subscriber identity module (eSIM) card is an embedded SIM card chip integrated on a motherboard of a terminal device. In addition, the terminal device also has a SIM card slot for inserting a physical SIM card. The physical SIM card is independently and detachably installed on the terminal device.

SUMMARY OF THE INVENTION

The present disclosure provides a switch module, a terminal device, a method for controlling a terminal device.

According to a first aspect of embodiments of the present disclosure, there is provided a switch module. The switch module includes: a set of first-class pins configured to couple with a processing module; two sets of second-class pins, in which a first set of second-class pins is configured to couple with a first subscriber identification module (SIM) card, and a second set of second-class pins is configured to couple with a second SIM card; a first control pin configured to couple with a control output pin of the processing module and receive a switching signal; and a switch circuit, respectively coupled with the first control pin, the first-class pins and the two sets of second-class pins, in which the switch circuit is configured to turn on a path between the first-class pins and the first set of second-class pins or a path between the first-class pins and the second set of second-class pins according to the switching signal, to enable switching between the first SIM card and the second SIM card.

According to a second aspect of embodiments of the present disclosure, there is provided a terminal device. The terminal device includes: a processing module; a first SIM card integrated with the processing module; a SIM card slot for installing a second SIM card; a switch module, respectively coupled with the processing module, the first SIM card and the second SIM card. The switch module includes: a set of first-class pins configured to couple with a processing module; two sets of second-class pins, in which a first set of second-class pin is configured to couple with a first subscriber identification module (SIM) card, and a second set of second-class pins is configured to couple with a second SIM card; a first control pin configured to couple with a control output pin of the processing module and receive a switching signal; and a switch circuit, respectively coupled with the first control pin, the first-class pins and the two sets of second-class pins, in which the switch circuit is configured to turn on a path between the first-class pins and the first set of second-class pins or a path between the first-class pins and the second set of second-class pins according to the switching signal, to enable switching between the first SIM card and the second SIM card.

According to a third aspect of embodiments of the present disclosure, there is provided a method for controlling a terminal device. The terminal device includes a first SIM card and a second SIM card. The method includes: generating a switching signal; and turning on a path between the processing module and the first SIM card or a path between the processing module and the second SIM card according to the switching signal.

It should be understood that the above general description and the following detailed description are only exemplary and explanatory, and do not limit the present disclosure.

BRIEF DESCRIPTION OF THE DRAWINGS

The drawings herein are incorporated into and form a part of the specification, showing embodiments in accordance with the invention, and are used together with the specification to explain the principles of the invention.

DETAILED DESCRIPTION OF THE PREFERRED EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
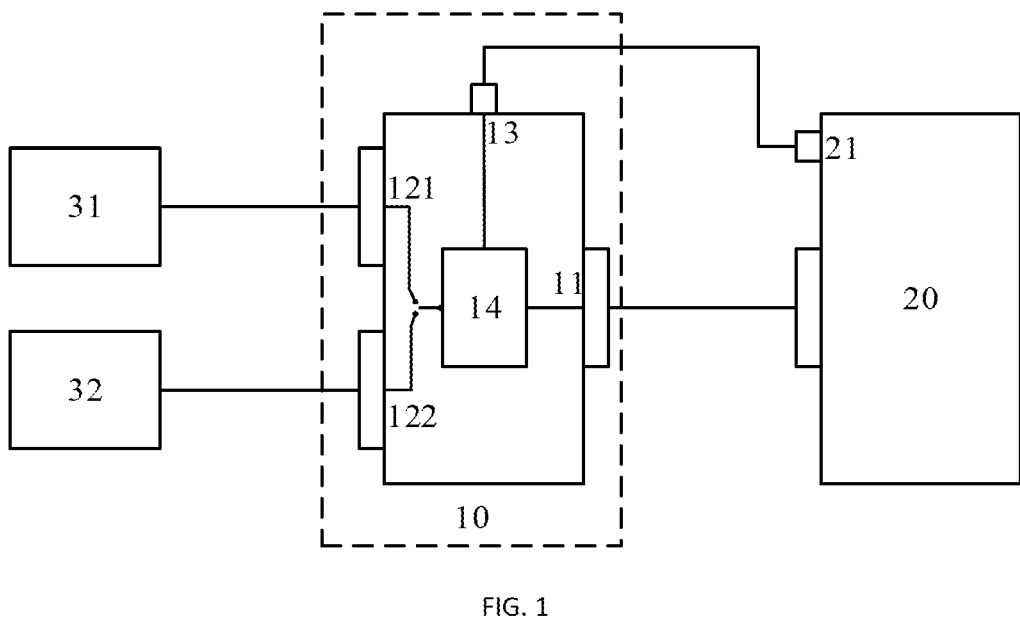
FIG. 1 is a schematic diagram illustrating a switch module according to an embodiment of the present disclosure.

With reference to FIG. 1, an embodiment of the present disclosure provides a switch module 10. The switch module 10 includes a set of first-class pins 11 configured to couple with a processing module 20, two sets of second-class pins, in which a first set of second-class pins 121 is configured to couple with a first subscriber identification module (SIM) card 31, and a second set of second-class pins 122 is configured to couple with a second SIM card 32. The first SIM card 31 is an embedded eSIM card integrated with the processing module, and the second SIM card 32 is a SIM card installed in a SIM card slot of a terminal device. The switch module can further include a first control pin 13 configured to couple with a control output pin 21 of the processing module 20 and receive a switching signal, in which the switching signal is configured to selectively control any set of second-class pins coupled with the first-class pins, and a switch circuit 14, respectively coupled with the first control pin 13, the first-class pins 11 and the two sets of second-class pins, in which the switch circuit 14 is configured to turn on a path between the first-class pins 11 and the first set of second-class pins 121 or a path between the first-class pins 11 and the second set of second-class pins 122 according to the switching signal, to enable switching between the first SIM card and the second SIM card.

In an embodiment, the first-class pins 11 include one or more pins. The first-class pins 11 may be ends led from the switch circuit 14 of the switch module 10 and configured for coupling with a peripheral circuit. For example, the first-class pins 11 are configured to couple with the processing module 20. The first-class pins 11 are coupled with the processing module 20, and may receive a signal sent from the processing module 20 and transmit the signal to the switch circuit 14 of the switch module 10.

In an embodiment, the second-class pins include one or more pins. The second-class pins may be ends led from the switch circuit 14 of the switch module 10 and configured for coupling with the peripheral circuit.

For example, the first-class pins 11 and the second-class pins are respectively disposed on different sides of a chip where the switch module 10 is located. In addition, the two sets of second-class pins may be arranged side by side on a same side of the chip where the switch module 10 is located.

For example, in the two sets of second-class pins included in the switch model 10, respective pins of the first set of second-class pins 121 are in contact with pins of the first card 31, to realize a connection between the first set of second-class pins 121 and the first SIM card 31. Respective pins of the second set of second-class pins 122 are in contact with pins of the second SIM card 32 respectively, to realize a connection between the second set of second-class pins 122 and the second SIM card 32.

In the switch circuit 14 of the switch module 10, a circuit part corresponding to the first-class pins 11 and a circuit part corresponding to any set of second-class pins may be conductive or non-conductive.

For an example, when the circuit part corresponding to the first-class pins 11 and the circuit part corresponding to any set of second-class pins are conductive, a signal obtained by the first-class pins 11 from the processing module 20 may be transmitted to the set of second-class pins.

For another example, when the circuit part corresponding to the first-class pins 11 and the circuit part corresponding to any set of second-class pins are non-conductive, the signal obtained by the first-class pins 11 from the processing module 20 may not be transmitted to the set of second-class pins.

In an embodiment, when any set of second-class pins is coupled with the first type pins 11, and the first-class pins 11 are coupled with the processing module 20, the second-class pins may receive a signal transmitted to the corresponding SIM which is sent by the processing module 20 and passed through the first-class pins 11 and the set of second-class pins couple to the first-class pins 11, or receive a signal from the corresponding SIM card.

In an embodiment, signals sent by the processing module 20 may include: a signal for the switch module 10 to realize a control function, and a signal for the SIM card.

The signals sent by the processing module 20 includes but is not limited to at least one of:

a power signal, configured to provide an operating power to the switch module 10 and the SIM card;

an oscillating signal, configured to provide alternating current to the switch module 10;

an IO signal, configured to provide an IO signal to the switch module 10 and the SIM card;

a switching signal, configured to provide a switching signal to the switch module 10;

a gating signal for gating;

a reset signal, configured to reset the SIM card;

a clock signal is configured to provide an operating clock to the SIM card.

In an example, the first-class pins 11 are configured to receive a signal for the SIM card.

In an embodiment, the first SIM card 31 and the second SIM card 32 are two different SIM cards.

In one embodiment, the first SIM card and the second SIM card are two SIM cards with different forms and similar functions.

Exemplarily, the first SIM card 31 is an embedded SIM (Embedded Subscriber Identity Module, eSIM card.

Here, the embedded eSIM card may be a virtual SIM card.

In another example, the second SIM card is a physical SIM card that may be installed in the SIM card slot of the terminal device.

In an embodiment, the embedded eSIM card is a blank SIM chip directly integrated in the processing module 20 of the terminal device. The embedded eSIM card may realize the same function as the physical SIM card by downloading a data file related to the eSIM through network.

The functions that may be implemented by the embedded eSIM card include but are not limited to:

sending and receiving text messages;

fixed dialing;

network data services.

In an embodiment, the terminal device may use a combination of different numbers of the first SIM card and the second SIM card.

For an example, the combination may be a combination of one embedded eSIM card and two second SIM cards.

For another example, the combination may also be a combination of one embedded eSIM card and one second SIM card.

The first set of second-class pins 121 may transmit a signal for the SIM card sent by the processing module 20 and passed through the set of first-class pins 11 to the first SIM card 31.

The second set of second-class pins 122 may transmit the signal for the SIM card sent by the processing module 20 and passed through the set of first-class pins 11 to the second SIM card 32.

In an embodiment, the first control pin 13 may be an end led from the switch circuit 14 of the switch module 10 and configured for coupling with the peripheral circuit.

In an example, the first control pin 13 is configured to receive the switching signal output from the control output pin 21 of the processing module 20.

The switching signal may be a signal that controls switching of the switching circuit 14.

In an embodiment, the switch circuit 14 may be a logic circuit, and the switching signal is a logic signal for the switch circuit 14 to turn on different set of second-class pins.

In an embodiment, the switch circuit 14 may be a circuit with a switch, which may be a two-to-one switch for selectively coupling with any set of second-class pins for the first-class pins 11.

In an embodiment, the switch circuit 14 receives the switch signal from the first control pin 13. For an example, when the path between the first-class pins 11 and the first set of second-class pins 121 is turned on, the first set of second-class pins 121 coupled with the first SIM card 31, and starting the first SIM card is realized. For another example, when the path between the first-class pins 11 and the second set of second-class pins 122 is turned on, the second set of second-class pins 121 coupled with the second SIM card, and starting the second SIM card is realized. In this way, the first SIM card or the second SIM card is started based on the switching signal. The switching connection and usage of the first SIM card and the second SIM card are realized through the switching signal. Therefore, the switching of the first SIM card, that is, the embedded, eSIM card, and the physical second SIM card may be realized flexibly according to the switching signal, and effectiveness of the switching is improved.

Figure 2:
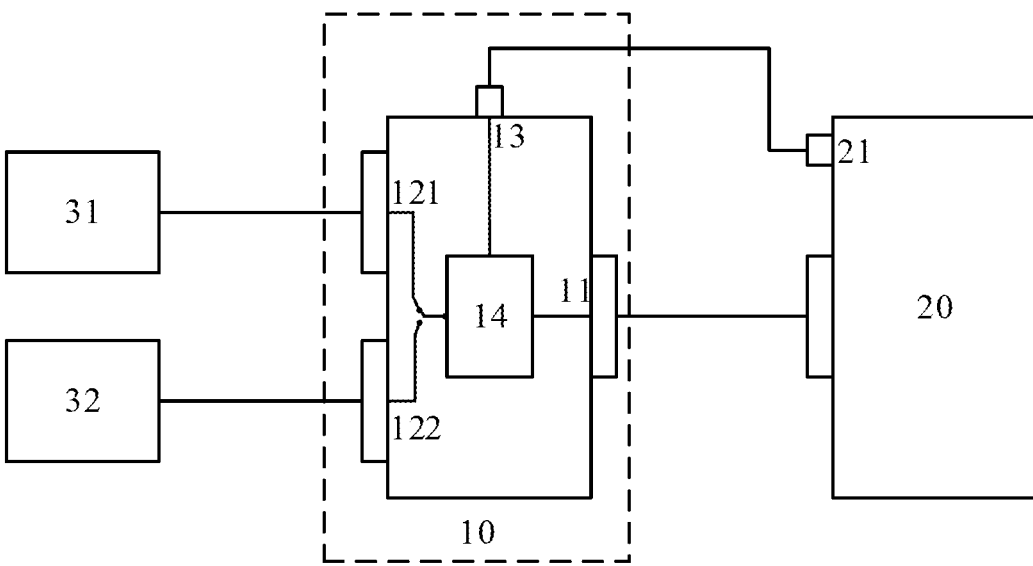
FIG. 2 is a schematic diagram illustrating a switch module according to an embodiment of the present disclosure.
Figure 3:
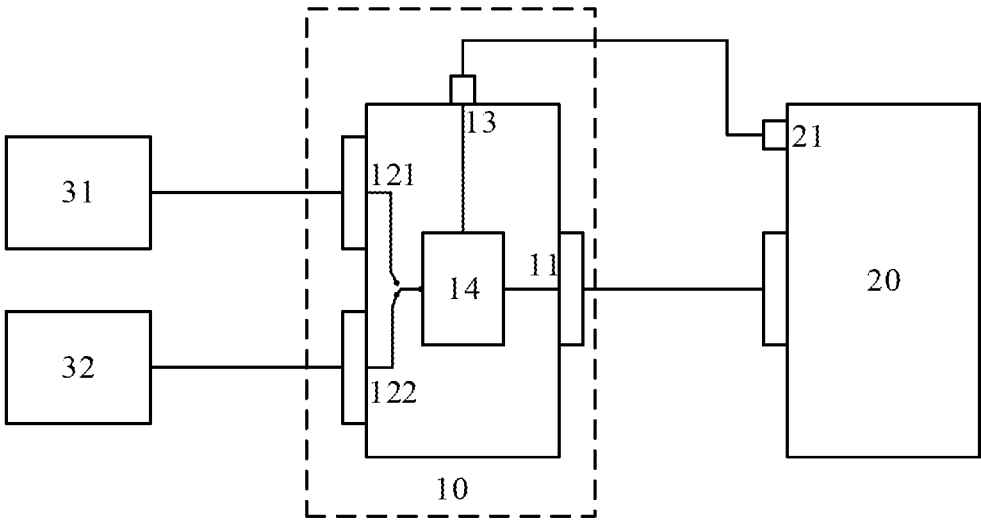
FIG. 3 is a schematic diagram illustrating a switch module according to an embodiment of the present disclosure.

In embodiments of the present disclosure, with reference to FIG. 2 and FIG. 3, the switch circuit 14 is configured to turn on the path between the first-class pins 11 and the first set of second-class pins 121 and turn off the path between the first-class pins 11 and the second set of second-class pins 122 when the switching signal is a first level signal; or the switching circuit 14 is configured to turn on the path between the first-class pins 11 and the second set of second-class pins 122 and turn off the path between the first-class pins 11 and the first set of second-class pins 121 when the switching signal is a second level signal.

In some embodiments, a level value of the first level signal is different from a level value of the second level signal. For example, the level value of the first level signal is lower than the level value of the second level signal. For example, a logic value of the first level signal may be 0, and a logic value of the second level signal may be 1.

As shown in FIG. 2, the logic value of the first level signal is 0, and the switch circuit 14 may be controlled to be at a lower level, to turn on the path between the first-class pins 11 and the first set of second-class pins 121 and turn off the path between the first-class pins 11 and the second set of second-class pins 122 when the switching signal is a first level signal As shown in FIG. 3, the logic value of the second level signal is 1, the switch circuit 14 may be controlled to be at a higher level, to turn on the path between the first-class pins 11 and the second set of second-class pins 122 and turn off the path between the first class pins 11 and the first set of second-class pins 121 when the switching signal is a second level signal For an example, the higher level may be, but is not limited to, any suitable value such as 1V, 2V, and 3V. For another example, the lower level may be, but not limited to, any suitable value such as 4V, 5V.

In an embodiment of the present disclosure, the connection or disconnection between the first-class pins 11 and the two sets of second-class pins may be realized through different level signals. Therefore, the first-class pins 11 may be connected or disconnected with any one of the two sets of second-class pins by changing the level signal.

Figure 4:
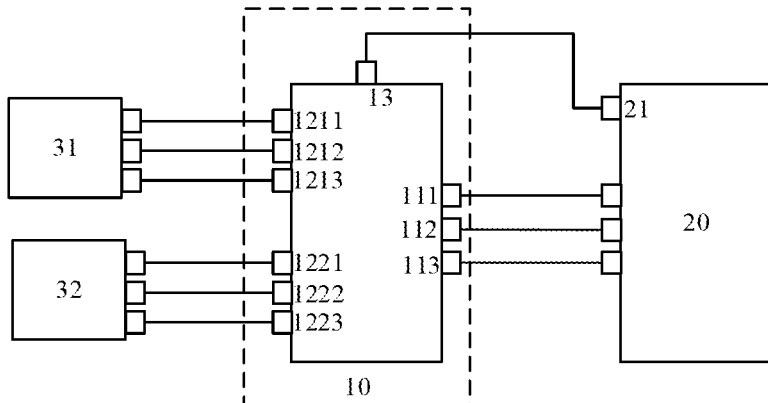
FIG. 4 is a schematic diagram illustrating a switch module according to an embodiment of the present disclosure.

With reference to FIG. 4, in an embodiment of the present disclosure, the first-class pins 11 include:

a first clock pin 111 configured to provide a clock signal to the first SIM card 31 or the second SIM card 32;

a first reset pin 112 configured to provide a reset signal to the first SIM card 31 or the second SIM card 32; and a first input-output (IO) pin 113 configured to transmit an IO signal between the processing module 20 and the first SIM card 31 or between the processing module 20 and the second SIM card 32.

In an embodiment, the first clock pin 111 is coupled with the processing module 20 and configured to receive the clock signal obtained from the processing module 20 and provide the clock signal to the first SIM card 31 or the second SIM card 32. For an example, when a channel between the first clock pin 111 and the first SIM card 31 is turned on, the first clock pin 111 provides the clock signal to the first SIM card 31. For another example, when a channel between the first clock pin 111 and the second SIM card 32 is turned on, the first clock pin 111 provides the clock signal to the second SIM card 32.

The clock signal, which provides a clock frequency, may synchronize timings between the first SIM card and the processing module or timings between the second SIM card and the processing module.

The first reset pin 112 is coupled to the processing module 20 and is configured to receive the reset signal obtained from the processing module 20 and provide the reset signal to the first SIM card 31 or the second SIM card 32. For an example, when a channel between the first reset pin 112 and the first SIM card 31 is turned on, the first reset pin 112 provides the reset signal to the first SIM card 31. For another example, when a channel between the first reset pin 112 and the second SIM card 32 is turned on, the first reset pin 112 provides the reset signal to the second SIM card 32.

In an embodiment, the reset signal may be configured to restore a software program in hardware to run in a specific program segment tinder a condition of instability or jump.

In some embodiments, the first IO pin is coupled to the processing module 20 and configured to receive the IO signal obtained from the processing module 20 and provide the IO signal to the first SIM card 31 or the Second SIM card 32.

In an example, when a channel between the first IO pin 113 and the first SIM card 31 is turned on, the first IO pin 113 provides the IO signal to the first SIM card 31.

In another example, when a channel between the first IO pin 113 and the second SIM card 32 is turned on, the first IO pin 113 provides the IO signal to the second SIM card 32.

In some embodiments, the IO signal may a data signal to be input or output.

In embodiments of the present disclosure, in the first-class pins 11, the first clock pin 111 may transmit the clock signal, the first reset pin 112 may transmit the reset signal, and the first IO pin 113 may transmit the IO signal, which may provide the corresponding signal to the first SIM card 31 or the second SIM card 32.

Figure 5:
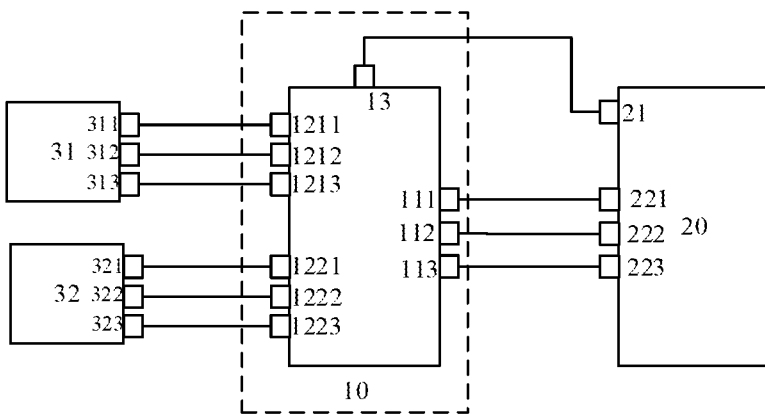
FIG. 5 is a schematic diagram illustrating a switch module according to an embodiment of the present disclosure.

With reference to FIGS. 4 and 5, in an embodiment of the present disclosure, the set of second-class pins includes:

a second clock pin configured to provide a clock signal to the first SIM card 31 or the second SIM card 32;

a second reset pin configured to provide a reset signal to the first SIM card 31 or the second SIM card 32; and a second IO pin configured to transmit an IO signal between the first SIM card 31 and the processing module or between the second SIM card 32 and the processing module.

In some embodiments, the second clock pins of the two sets of second-class pins may include: two clock pins respectively coupled with two SIM cards.

As shown in FIG. 4, the second clock pins include: a second clock pin 1211 of the first set of second-class pins 121 coupled with the first SIM card 31;

a second clock pin 1221 of the second set of second-class pins 122 coupled with the second SIM card 32.

When the second clock pin 1211 of the first set of second-class pins 121 coupled with the first SIM card 31 is coupled with the first clock pin 111, the second clock pin 1211 of the first set of second-class pins 121 is configured to provide the clock signal to the first SIM card 31.

When the second clock pin 1212 of the second set of second-class pins 122 coupled with the second SIM card 32 is coupled with the first clock pin 111, the second clock, pin 1212 of the second set of second-class pins 122 is configured to provide the clock signal to the second SIM card 32.

In some embodiments, the second reset pins of the two sets of second-class pins may include: two reset pins respectively coupled to two SIM cards.

As shown in FIG. 4, the second reset pins include: a second reset pin 1212 of the first set of second-class pins 121 coupled with the first SIM card 31;

a second reset pin 1222 of the second set of second-class pins 122 coupled with the second SIM card 32.

When the second reset pin 1212 of the first set of second-class pins 121 coupled with the first SIM card 31 is coupled with the first reset pin 112, the second reset pin 1212 of the first set of second-class pins 121 is configured to provide the reset signal to the first SIM card 31.

When the second reset pin 1222 of the second set of second-class pins 122 coupled with the second SIM card 32 is coupled with the first reset pin 112, the second reset pin 1222 of the second set of second-class pins 122 is configured to provide the reset signal to the second SIM card.

In some embodiments, the second IO pins of the two sets of second-class pins may include: at least two IO pins respectively coupled with two SIM cards.

As shown in FIG. 4, the second IO pins include: a second IO pins 1213 of the first set of second-class pins 121 coupled with the first SIM card 31;

a second IO pins 1223 of the second set of second-class pins 122 coupled with the second SIM card 32.

When the second IO pin 1213 of the first set of second-class pins 121 coupled with the first SIM card 31 is coupled with the first IO pin 113, the second IO pin 1213 of the first set of second-class pins 121 is configured to provide the IO signal to the first SIM card 31.

When the second IO pin 1223 of the second set of second-class pin 122 coupled with the second SIM card 31 is coupled with the first IO pin 113, the second IO pin 1223 of the second set of second-class pin 122 is configured to provide the IO signal to the second SIM card 32.

In this way, the second clock pins, the second reset pins and the second IO pins in different sets of second-class pins are respectively coupled with the first clock pin, the first reset pin and the first IO pin in the first-class pins, which may realize transmission of various types of signals from the processing module to different SIM cards.

Figure 6:
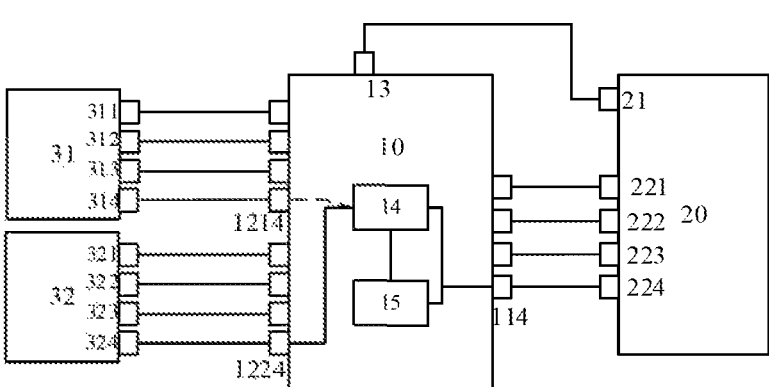
FIG. 6 is a schematic diagram illustrating a switch module according to an embodiment of the present disclosure.

With reference to FIG. 6, in an embodiment of the present disclosure, the first-class pins 11 include: a first power supply pin 114 configured to provide a first operating voltage with a first level;

the two sets of second-class pins include second power supply pins 1214, 1224, respectively;

the switch module 10 further includes:

a voltage conversion circuit 15 coupled with the first power supply pin 114, at least configured to, when the switch circuit turns on the path between the first-class pins 11 and the first set of second-class pins 1214, convert the first operating voltage with the first level into a second operating voltage with a second level, and output the second operating voltage through the second power supply pin 1214 in the first set of second-class pins, in which the second level is different from the first level;

in which, the switch circuit 14 turns on the path between the first-class pins 11 and the second set of second-class pins 122, the second power supply pin 1224 in the second set of second-class pins 122 is coupled with the first power supply pin 114.

In embodiments of the present disclosure, the second level is lower than the first level.

For example, the second level is 1.8 v, and the first level is 3V.

For the first SIM card 31 that is the embedded eSIM card, the level of the operating voltage that the first SIM card 31 may operate is the second level. For the second SIM card 32 installed the SIM card slot of the terminal device, the level of the operating voltage that the second SIM card 32 may operate is first level or second level.

The first operation voltage with the first level or the second operating voltage with the second level may be provided to the second SIM card 32 through the second power supply pin 1224 in the second set of second-class pins.

The second operating voltage with the second level may be provided to the first SIM card 31 through the second power supply pins 1214 in the first set of second-class pins.

In some embodiments, the voltage conversion circuit 15 may convert the first operating voltage with the first level to the second operating voltage with the second level, to provide the second operating voltage with the second level for the first SIM card 31.

In some embodiments, the switch circuit 14 turns on the path between the first-class pins 11 and the second set of second-class pins 12 to enable the second SIM card 32.

In addition, the second power supply pin 1224 of the second set of second-class pins 122 is coupled with the first power supply pin 114, and may provide the first operating voltage with the first level to the second SIM card 32.

In an embodiment of the present disclosure, through the coupling relationship between the switch circuit 14 and the voltage conversion circuit 15, the first power supply pin 114, and the second power supply pins of the two sets of second-class pins in FIG. 6, different SIM cards may be provided with different required operating voltages to meet different operating voltage requirements of different SIM cards.

Figure 7:
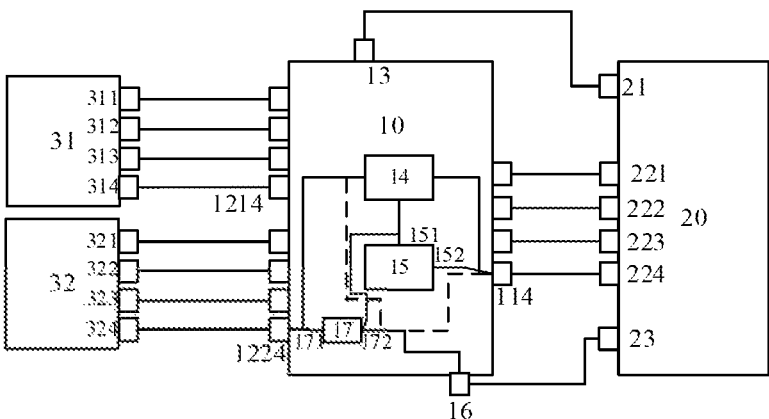
FIG. 7 is a schematic diagram illustrating a switch module according to an embodiment of the present disclosure.

With reference to FIG. 7, in an embodiment of the present disclosure, the switch module 10 further includes:

a second control pin 16 configured to receive a control signal, in which the control signal is configured to control the second power supply pin 1224 in the second set of second-class pins 122 to output the first operating voltage or the second operating voltage when the switch circuit 14 turns on the path between the first-class pins 11 and the second set of second-class pins 122;

a controlled switch 17 including an output end 171 and an input end 172, in which the output end 171 is coupled with the second power supply pin 1224 in the second set of second-class pins, and the input end 172 is configured to couple with an output end of the voltage conversion circuit 15 or with the first-class pins 11 according to the control signal received by the second control pin 16;

in which the voltage conversion circuit 15 is configured to convert the first operating voltage with the first level into the second operating voltage with the second level when the swatch circuit 14 turns on the path between the first-class pins 11 and the second set of second-class pins 133, and the input end 172 of the controlled switch 17 is coupled with the voltage conversion circuit 15.

In an embodiment of the present disclosure,, the controlled switch 17 may be a two-to-one switch. The controlled switch 17 may be composed of a transistor or a triode.

When the control signal indicates that the operating voltage of the second SIM card 32 is the first operating voltage with the first level, the controlled switch 17 causes the input end 172 of the controlled switch 17 to be coupled with the first power supply pin 114 of the first-class pins 11 according to the received control signal.

In an example, the input end 172 of the controlled switch 17 may be directly coupled with the first power supply pin 114 of the first-class pins 11, or may also be indirectly coupled with the first power supply pin 114 of the first-class pins 11 through the switch circuit 14. In this way, the second SIM card 323 is enabled with the first operating voltage with the first level.

When the control signal indicates that the operating voltage of the second SIM card 32 is the second operating voltage of the second level, the controlled switch 17 causes the input end 172 of the controlled switch 17 to be coupled with the output end 151 of the voltage conversion circuit 15 according to the received control signal.

When the switch circuit 14 turns on the path between the first-class pins 11 and the second set of second-class pins 122, the voltage conversion circuit 15 may convert the first operating voltage with the first level to the second operating voltage with the second level.

In this way, the second SIM card 32 is enabled with the second operating voltage with the second level.

In an embodiment of the present disclosure, when the same SIM card may require different operating voltages under different operating states, the controlled switch may control the voltage conversion circuit to provide voltages of different levels according to the control signal.

Figure 8:
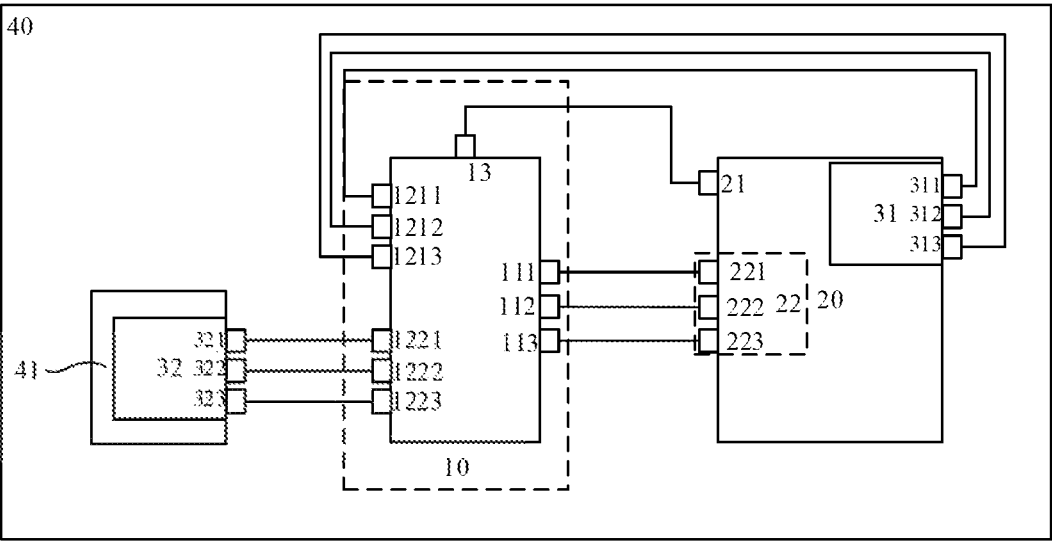
FIG. 8 is a schematic diagram illustrating a terminal device according to an embodiment of the present disclosure.

With reference to FIG. 8, in an embodiment of the present disclosure, a terminal device 40 is provided. The terminal device 40 includes:

a processing module 20;

a first SIM card 31 integrated with the processing module 20;

a SIM card slot 41 for installing a second SIM card 32;

a switch module 10 according to the above embodiments, respectively coupled with the processing module 20, the first SIM card 31 and the second SIM card 32.

In an embodiment of the present disclosure, the terminal device may include: a mobile phone, a tablet computer, a phone watch, a vehicle-mounted device, or other communicable devices.

The terminal device may include a device with a touch display screen.

The processing module 20 may be a chip with as processing circuit.

In an example, the processing module 20 may be, but not limited to, a central processing unit (CPU)? a microprocessor, or an embedded controller.

In some embodiments, the first SIM card 31 integrated with the processing module 20 may include a chip circuit of the first SIM card 31 integrated in circuit of the processing module 20.

In an example, the chip circuit of the first SIM card 31 is integrated in the circuit of the processing module 20, and is integrally formed with the circuit of the processing module 20 into a chip.

In an example, the processing module 20 is at least integrated with one first SIM card 31. The number of the integrated first SIM cards 31 may be any suitable value, which will not be limited in embodiments of the present disclosure.

In some embodiments, the SIM card slot 41 is configured to install the second SIM card 32, so that the second SIM card 31 is detachably installed in the SIM card slot 41.

In some embodiments, the processing module 20 may include: a plurality of SIM card slots 41.

In an example, the number of the SDI card slots 41 included in the processing module 20 may be, but is not limited to, any suitable value, such as 1 or 2, which will not be limited in embodiments of the present disclosure.

In some embodiments, the switch module 10 is coupled with the processing module 20 and is configured to receive a signal sent by the processing module 20.

In an example, the switch module 19 coupled with the processing module 20 is configured to receive the switching signal sent by the processing module 20 and the signal required by the SIM card.

In another example, the switch module 10 controls the connection with different SIM cards according to the switch signal.

In an embodiment, the switch module 10 at least controls the switching between the first SIM card 31 and the second SIM card 32 according to the switching signal.

For another example, the switch module 10 outputs the signal required by the SIM card to the connected SIM card according to the connection with different SIM cards.

The switch module 10 at least transmits the signal required by the SIM card to the connected first SIM card or the second SIM card.

In embodiments of the present disclosure, the terminal device may integrate an embedded eSIM card into the processing module, and may also install the detachable SIM card, thus providing usage experience of a variety of different types of SIM cards.

With reference to FIG. 8, in an embodiment of the present disclosure, the processing module 20 further includes:

a first control output pin 21 coupled with a first control pin 31 of the switch module 10 and output a switching signal, in which, the switching signal is configured to control any set of second-class pins coupled with first-class pins of the switch module.

In an embodiment of the present disclosure, the control output pin 21 is coupled with a switch circuit 14 of the switch module 10. After generating the switching signal, the processing module 20 outputs the switching signal to the switch module 10 through the control output pin 21.

In an embodiment of the present disclosure, the processing module 20 may output the switching signal to the switch module 10 through the first control pin 21, so that the switch module 10 may realize the switching between the first SIM card and the second SIM card.

With reference to FIG. 8, in an embodiment of the present disclosure, the processing module 20 further includes:

a set of third-class pins 22 configured to couple with the switch module 10.

In an embodiment, pins of the set of third-class pins 22 is respectively coupled with corresponding pins of the first-class pins 11 of the switch module 10.

In an embodiment, the third-class pins 22 are connected to the switch module 10, and may transmit the signal required by the SIM card to the switch module 10.

In some embodiments of the present disclosure, the third-class pins are general-purpose input/output (GPIO) pins.

In an embodiment, the general-purpose it input/output (GPIO) pins may be freely used by programs of the processing module 20.

In an embodiment, other pins in the processing module 20 other than the third-class pins 22, such as the control output pin 21, may also be the GPIO pin.

In an embodiment with using the GPIO pins for the processing module 20, the GPIO pins have low power consumption, simple in wiring, and low cost, which is convenient for the processing module 20 to call the GPIO pins.

With reference to FIG. 8, in an embodiment of the present disclosure, the third-class pins 22 include:

a third clock pin 221, coupled with a first clock pin 111 of the switch module 10, and configured to provide a clock signal to the first SIM card 31 or the second SIM card 32 through the first clock pin 111;

a third reset pin 322, coupled with a first reset pin 112 of the switch module 10, and configured to provide a reset signal to the first SIM card 31 or the second card 32 through the first reset pin 112;

a third IO pin 223, coupled with a first IO pin 113 of the switch module 10, and configured to provide an IO signal to the first SIM card 31 or the second SIM, card 32 through the first IO pin 113.

In an embodiment, the third clock pin 211 is coupled with an internal circuit of the processing module 20, and when the internal circuit generates the clock signal, the clock signal is transmitted to the first clock pin 111.

In an embodiment, the third reset pin 222 is coupled with the internal circuit of the processing module 20, and when the internal circuit generates the reset signal, the reset signal is transmitted to the first reset pin 112.

In an embodiment, the third IO pin 223 is coupled with the internal circuit of the processing module 20, and when the internal circuit generates the IO signal, the IO signal is transmitted to the first IO pin 113.

In this way, the third-class pins may provide the clock signal, the reset signal, the IO signal and the like to the first SIM card 31 or the second SIM card 32.

With reference to FIG. 6, FIG. 7 and FIG. 8, in embodiments of the present disclosure, the third-class pins further include:

a third power supply pin 224, coupled with a first power supply pin 114 of the switch module 14, and configured to provide a first operating voltage with a first level to the first SIM card 31 or the second SIM card 32 through the first power supply pin 114.

In an embodiment of the present disclosure, the first operating voltage obtained by the third power supply pin 224 may be obtained by connecting the processing module to a power supply (not shown in the figures) or the terminal device.

When the processing module 20 is coupled with the first SIM card or the second SIM card, the first operating voltage with the first level may be provided to the first SIM card 31 or the second SIM card 32 through the third power supply pin 224.

In this way, through the third power supply pin 224, the operating voltage may be provided to any SIM card.

With reference to FIG. 6, FIG. 7 and FIG. 8, in embodiments of the present disclosure, the processing module 20 further includes: a second control output pin 23 coupled with a second control pin 16 of the switch module 14, and configured to output a control signal, in which, the control signal is configured to control to output the first operating voltage or the second operating voltage to the second SIM card 32.

In an embodiment of the present disclosure, the control signal is generated by the processing module 20 in response to determining that the SIM card in an operation state is the second SIM card and state information of the second SIM card.

For an example, when it is determined that a target operating voltage of the second SIM card 32 is the first operating voltage, the control signal instructs to output the first operating voltage to the second SIM card.

For another example, when it is determined that the target operating voltage of the second SIM card 32 is the second operating voltage, the control signal instructs to output the second operating voltage to the second SIM card 32.

In this way, the switch module 10 may be controlled to output the first operating voltage or the second operating voltage to the second SIM card 32 through the second control output pin 23, to meet different operating voltages requirements of the second SIM card.

Figure 9:
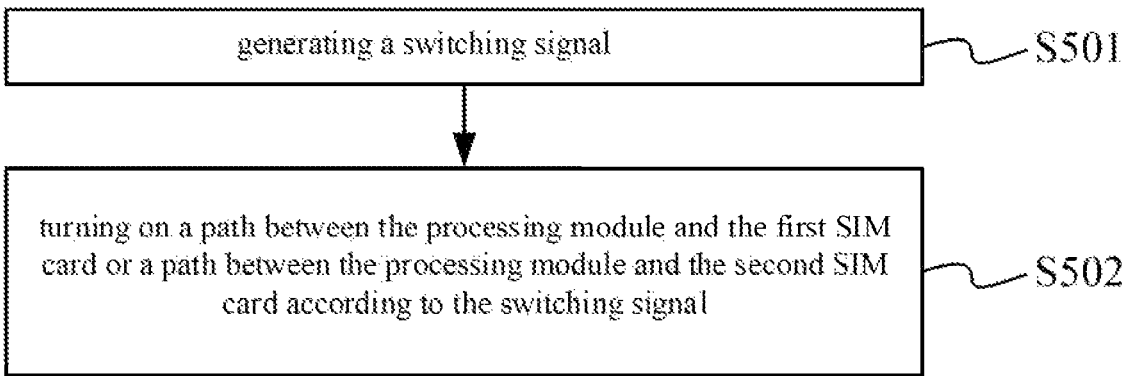
FIG. 9 is a flowchart illustrating a method for controlling a terminal device according to an embodiment of the present disclosure.

With reference to FIG. 9, in an embodiment of the present disclosure, a method for controlling a terminal device is provided. The terminal device includes a first SIM card and a second SIM card. The first SIM card may be an embedded eSIM card integrated with a processing module of the terminal device, and the second SIM card may be a SIM card installed in a SIM card slot of the terminal device. The method may include the following blocks.

At block S501, a switching signal is generated.

At block S502, a path between the processing module and the first SIM card or a path between the processing module and the second SIM card is turned on according to the switching signal.

In an embodiment of the present disclosure, the terminal device may include: a mobile phone, a tablet computer, a phone watch, a vehicle-mounted device, or other communicable devices.

The terminal device may include a device with a touch display screen.

The processing module may be a chip with a processing circuit. The processing module may correspond to the processing module 20 in the foregoing embodiments.

In an example, the processing module may be, but not limited to, a central processing unit (CPU) and a microprocessor.

In an embodiment, the embedded eSIM card integrating on the processing module of the terminal device may include the embedded eSIM card is integrally formed on the processing module of the terminal device.

The switching signal is a signal for controlling switching of the switching circuit 14 in the foregoing embodiments.

In an example, the switching signal may include, but is not limited to, a level signal.

Regarding the block S501, generating the switching signal may include: generating the switching signal through the processing module.

Specifically, the switching signal may be generated through a modem of a software layer of the processing module of the terminal device.

In an embodiment, generating the switching signal through the processing module may include:

generating the switching signal through the processing module according to an operation on the terminal device.

Illustratively, the operations may include, but not limited to:

an operation of powering on or off the terminal device;

an operation of enabling or disabling the first SIM card; or an operation of enabling or disabling the second SIM card.

For example, the operation may be an input instruction based on a mechanical key of the terminal device or an input instruction by touching a touch display screen.

In an embodiment, generating the switching signal though the processing module according to the operation on the terminal device may include at least one of:

generating the switching signal according to the operation instructing to turn on the terminal device;

generating the switching signal according to the operation instructing to enable or disable the first SIM card; or generating the switching signal according to the operation instructing to enable or disable the second SIM card.

In an embodiment, the switching signal may include:

a first switching signal for turning on a path between the processing module and the first SIM card; or a second switching signal for turning on a path between the processing module and the second SIM card.

In an embodiment, the first switching signal is different from the second switching signal.

Specifically, a value of the first switching signal is greater than a value of the second switching signal.

In an example, the switching signal may be a level signal.

In an embodiment, the block S502 may include: when the switching signal is the first switching signal, turning on the path between the processing module and the first SIM card; or, when the switching signal is the second switching signal, turning on the path between the processing module and the second SIM card.

In an example, when the path between the processing module and the first SIM card is turned on, the first SIM card may be enabled.

For another example, when the path between the processing module and the second SIM card is turned on, the second SIM card may be enabled.

In an embodiment of the present disclosure, switching the path between the processing module and the first SIM card or the second SIM card based on the switching signal, the first SIM card and the second SIM Card may be switched to use. In this way, flexibility and effectiveness of switching between different SIM cards may be improved by changing the generated switching signal.

Figure 10:
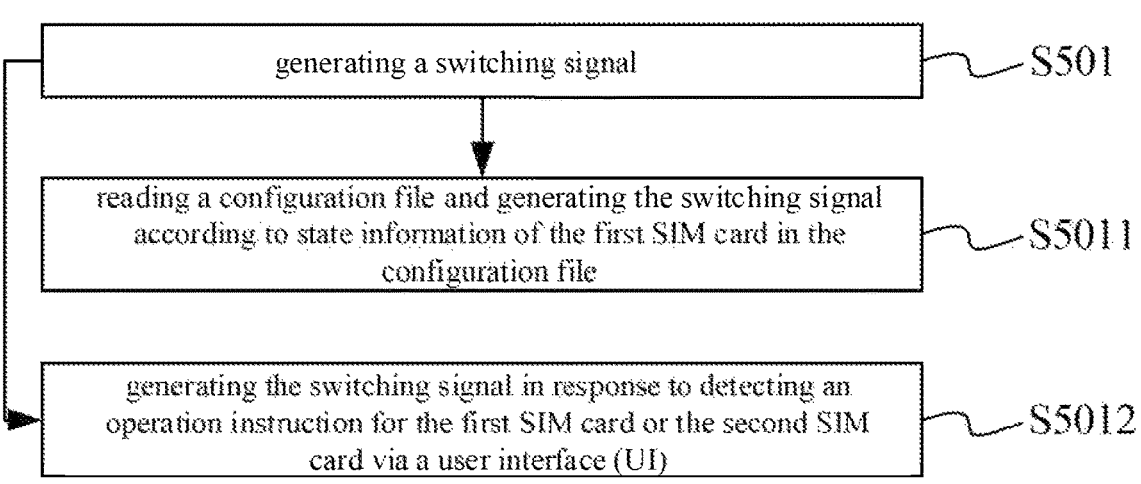
FIG. 10 is a flowchart illustrating a method for controlling a terminal device according to an embodiment of the present disclosure.

With reference to FIG. 10, in an embodiment of the present disclosure, the block S501 that generating the switching signal may include the following blocks.

At block S5011, a configuration file is read and the switching signal is generated according to state information of the first SIM card in the configuration file.

Or, at block S5012, the switching signal is generated in response to detecting an operation instruction or the first SIM card or the second SIM card via a user interface (UI).

The configuration file may be a file including parameters and initial settings, configured for a program of the terminal device.

In an embodiment, the configuration file may also be a file including configuration parameters related to the state information of the first SIM card.

In an embodiment, the configuration file is stored in a memory in the terminal device.

For example, the configuration file may be a configuration file of the SIM card or a configuration file of operating system.

In an example, the state information of the first SIM card in the configuration file may be: information indicating a state of the first SIM card.

In an example, the state information of the first SIM card may be one of:

enabling state information of the first SIM card;

disabling state information of the first SIM card.

Regarding the block S5011, generating the switching signal according to the state information of the first SIM card in the configuration file may include at least one of:

generating the first switching signal in response to the state information of the first SIM card being the enabling state information of the first SIM card;

generating the second switching signal in response to the state information of the first SIM card being the disabling state information of the first SIM card.

The block S5011 may be performed by the modem of the terminal device.

In an embodiment, regarding the block S5012, the user interface may be an interface for interaction and information exchange between the terminal device and the user.

In an embodiment, the user interface is displayed on the display screen of the terminal device.

In an example, the display screen may be a touch display screen.

In an embodiment, the operation instruction may include one of:

enabling the first SIM card;

enabling the second SIM card;

disabling the first SIM card; and disabling the second SIM card.

In some embodiments, the block S5012 may include at least one of:

generating the first switching signal in response to detecting the operation instruction of enabling the first SIM card by the user interface UI;

generating the first switching signal in response to detecting the operation instruction of disabling the second SIM card by the user interface UI;

generating the second switching signal in response to detecting the operation instruction of enabling the second SIM card by the user interface UI;

generating the second switching signal in response to detecting the operation instruction of disabling the first SIM card by the user interface UI;

In an embodiment, the block S5012 further includes: after the user interface UI detects the operation instruction on the first SIM card or the second SIM card, sending, by an application layer where the user interface is located, an instruction of generating the switching signal to the modem of the software layer through an application code interface, and generating the switching signal by the modem.

In an embodiment, the switching signal generated by the modem is sent to the control output pin of the processing module through a control code interface.

The control code interface is a code interface written in program language of a software control layer of the terminal device.

For example, the control code interface is a code interface written in Java language.

The application code interface is a code interface written in program language of a first layer of the application layer of the terminal device.

For example, the application code interface is a code interface written in Java language.

In an embodiment of the present disclosure, the switching signal is generated through the configuration file or through the operation instruction, and the switching signal may be generated according to different operations on the terminal device or according to the state of the first SIM card of the terminal device. In this way, the switching signal may be generated in different terminal application scenarios.

Figure 11:
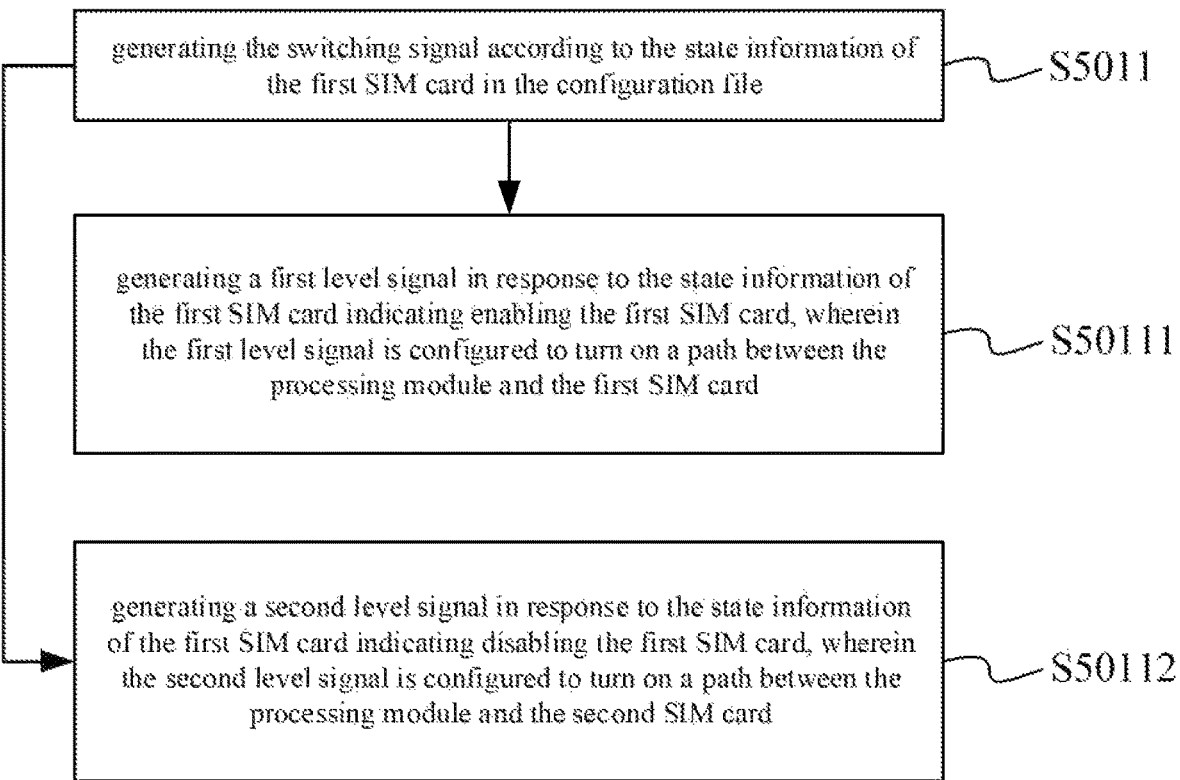
FIG. 11 is a flowchart illustrating a method for controlling a terminal device according to an embodiment of the present disclosure.

With reference to FIG. 11, in an embodiment of the present disclosure, generating the switching signal according to the state information of the first SIM card in the configuration file includes the following blocks.

At block S5011 a first level signal is generated in response to the state information of the first SIM card indicating enabling the first SIM card, in which the first level signal is configured to turn on a path between the processing module and the first SIM card; or At block S50112, a second level signal is generated in response to the state information of the first SIM card indicating disabling the first SIM card, in which the second level signal is configured to turn on a path between the processing module and the second SIM card.

The block S50111 includes: generating the first level signal through the modem in response to the state information of the first SIM card indicating enabling the first SIM card.

The block S50112 includes: generating a second level signal through the modem in response to the state information of the first SIM card indicating disabling the first SIM card.

In an embodiment, the first level signal and the second, level signal may be logic control values.

In an example, the first level signal may be a first logic control value.

In an example, the second level signal may be a second logic control value.

In an example, the first logic control value may be 0, and the second logic control value may be 1.

The processing module is configured to generate a control level according to the logic control value sent by the modem through the control code interface and transmit the control level to the control output pin.

The control output pin is output the switching signal to the switch module according to the control level to control the connection between the switch module and the first SIM card or the connection between the switch module and the second SIM card.

Thus, the connection between the processing module and the first SIM card, or the connection between the processing module and the second SIM card is realized.

In an embodiment, the configuration file records history state information of the first SIM card. In this way, it may be determined enabling or disabling of the first SIM card according to the historical state information of the first SIM card.

Figures 12, 13:
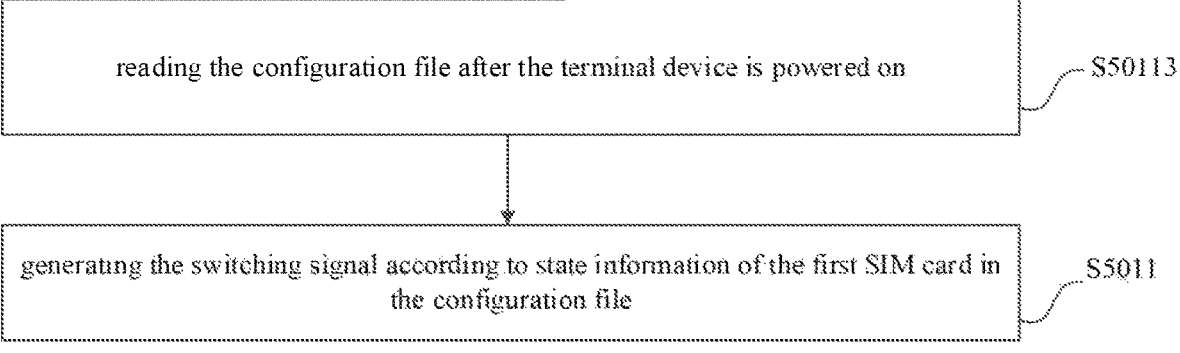
FIG. 12 is a flowchart illustrating a method for controlling a terminal device according to an embodiment of the present disclosure.
FIG. 13 is a flowchart illustrating a method for controlling a terminal device according to an embodiment of the present disclosure.

With reference to FIG. 12, in an embodiment of the present disclosure, reading the configuration file includes the following block.

At block S50115, the configuration file is read after the terminal device is powered on.

The configuration file at least records: at least one state information of the first SIM card in the last process of using the terminal device before the terminal device is powered off.

Regarding the block S50113, after the terminal device is powered on, the state information: of the first SIM card in the last process of using the terminal device that is recorded in the configuration file is read.

In an embodiment, the first level signal is generated in response to the state information of the first SIM card being enabling the first SIM card;

the second level signal is generated in response to the state information of the first SIM card being disabling the first SIM card.

In this way, the enabling state of the first SIM card before the power-off may be continued after the terminal is power-on again, without the user to re-open the first SIM card or re-close the second SIM card, thus improving user experience and saving user time.

With reference to FIG. 13, in an embodiment of the present disclosure, the method further includes the following block.

At block S503, it is determined the state information of the first SIM card in the configuration file according to an operation instruction for the first SIM card or the second SIM card.

The block S503 includes at least one of:

determining the enabling state information of the first SIM card in the configuration file according to the operation instruction instructing the enabling of the first SIM card or the disabling of the second SIM card;

determining the disabling state information of the first SIM card in the configuration file according to the operation instruction instructing the disabling of the first SIM card or the enabling of the first SIM card.

The execution of the step S503 is implemented by: detecting the operation instruction via the application layer, issuing the operation instruction to the modem through the application code interface; writing the state information of the first SIM in the configuration file through a read-write code interface by the modem.

The read-write code interface is a code interface written in program language of a second layer of the application layer of the terminal device.

For example, the read-write code interface is a code interface written in Java language.

In an embodiment of the present disclosure, the state information of the first SIM card is written in the configuration file according to the operation instruction in time, which will facilitate the reading and use of the configuration file after powering on again, and generate the switching signal in a timely and rapid manner.

Figure 14:
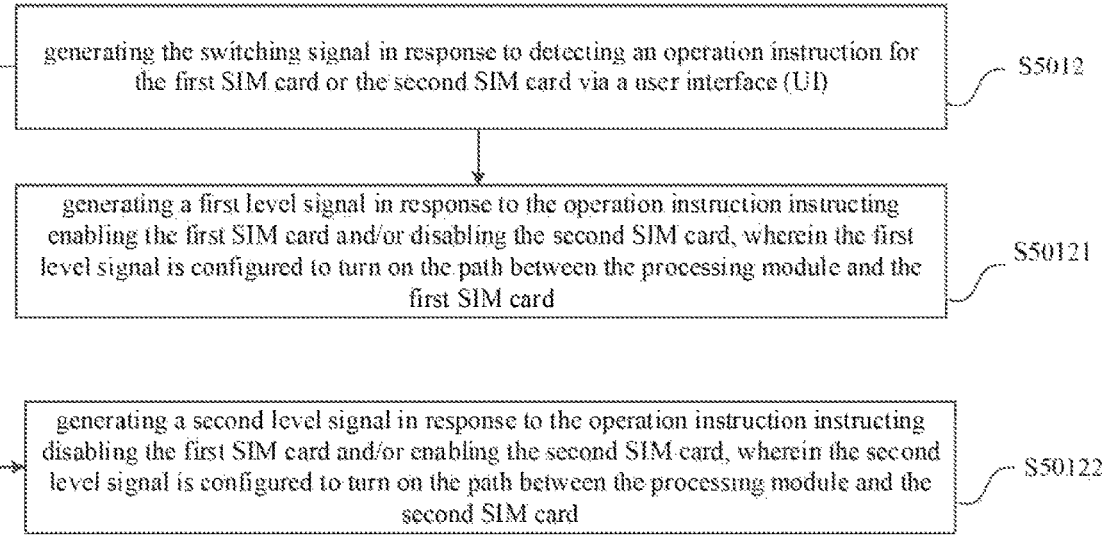
FIG. 14 is a flowchart illustrating a method for controlling a terminal device according to an embodiment of the present disclosure.

With reference to FIG. 14, an embodiment of the present disclosure, in the block S5012, generating the switching signal in response to detecting the operation instruction for the first SIM card of the second SIM card via the user interface (UI) includes:

block S50121, generating a first level signal in response to the operation instruction instructing enabling the first SIM card and/or disabling the second SIM card, in which the first level signal is configured to turn on the path between the processing module and the first SIM card, in which the first level signal is configured to turn on the path between the processing module and the first SIM card; or block S50122, generating a second level signal in response to the operation instruction instructing disabling the first SIM card and/or enabling the second SIM card, in which the second level signal is configured to turn on the path between the processing module and the second SIM card.

The enabling refers to allowing operation or usage, opening.

Corresponding the disabling refers to not allowing operation or usage, or closing.

In an embodiment, in the block S50121, the first level signal is configured to turn on the path between the processing module and the first SIM card, while turn off the path between the processing module and the second SIM card.

In another embodiment, in the block S50122, the second level signal is configured to turn on the path between the processing module and the second SIM card, while turn off the path between the processing module and the second SIM card.

In an embodiment, when the operation instruction instructs to enable the first SIM card, the corresponding instruction also instructs to disable the second SIM card.

In an embodiment, when the operation instruction instructs to enable the second SIM card, the corresponding instruction also instructs to disable the first SIM card.

In an embodiment of the present disclosure, in response to the user interface UI detecting the operation instruction on the first SIM card or the second SIM card, the switching signal is generated to enable or disable the first SIM card or the second SIM card, thus achieving flexible switching between the first SIM card and the second SIM card.

Figure 15:
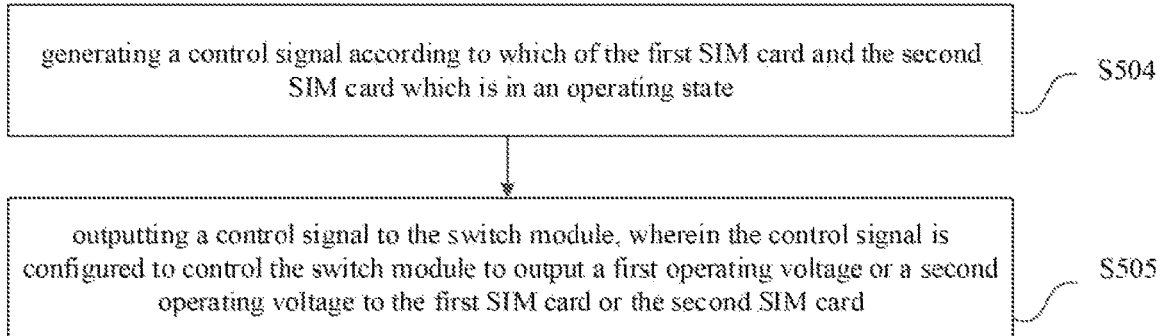
FIG. 15 is a flowchart illustrating a method for controlling a terminal device according to an embodiment of the present disclosure.

With reference to FIG. 15, in an embodiment of the present disclosure, the method further includes the following block.

At block S504, a control signal is generated according to which of the first SIM card and the second SIM card which is in an operating state.

At block S505, a control signal is output to the switch module. The control signal is configured to control the switch module to output a first operating voltage or a second operating voltage to the first SIM card or the second SIM card.

In an embodiment of the present disclosure, for the first SIM card of the embedded eSIM card, the voltage in the operating state may be the first operating voltage.

For the second SIM card installed in the card slot, the voltage in the operating state may be the first operating voltage or the second operating voltage.

The block S504 includes: generating the control signal instructing to output the first operating voltage according to the first SIM card and the second SIM card being in the state of the first operating voltage; or, generating the control signal instructing to output the second operating voltage according to the first SIM card and the second SIM card being the state of the second operating voltage.

The block S505 includes:

outputting the control signal indicating to output the first operating voltage or the control signal indicating to output the second operating voltage to the switch module.

In an embodiment, the control signal for controlling the first operating voltage or the second operating voltage of the second SIM card may be generated.

Specifically, for the control signal for controlling the first operating voltage of the second SIM card, the switch circuit in the switch module may be controlled to directly turn on the channel between the second power supply pin in the second set of second-class pins and the first power supply pin, such that the switch module may output the first operating voltage to the second SIM card.

Or, for the control signal for controlling the second operating voltage of the second SIM card, the voltage conversion circuit in the switch module may convert the first operating voltage into the second operating voltage, and the second power supply pin in the second set is connected with the voltage conversion circuit, such that the switch module may output the second operating voltage to the second SIM card.

In another embodiment, the control signal for controlling the first operating voltage of the first SIM card may be generated.

Specifically, for the control signal for controlling the first operating voltage of the first SIM card, the switch circuit in the switch module is controlled to directly turn on the channel between the second power supply pin in the first set of second power supply pins and the, first power supply pin 114.

In this way, different voltages may be output to different SIM cards through the control signal, to meet operating voltage requirements of different SIM cards.

The embedded eSIM card, in simple terms, is to directly embed a traditional SIM card into a chip of the device, rather than adding into the device as an independent and detachable component, without inserting a "physical" SIM card by the user. Compared with the traditional physical card, one of the major features of the eSIM card is that a blank SIM chip is directly integrated on a motherboard of the terminal device. Functions same as the traditional SIM and may be realized by writing into the eSIM chip through over-the-air download by the user. One difference is that one has a physical card and the other has no physical card, but both may achieve functions such as sending and receiving short messages, fixed dialing, and connecting to the Internet.

At present, the mobile phone adopts configuration of two SIM cards and one eSIM card at most. The existing baseband chip only supports two cards operating simultaneously, so the supported combination of the cards may only be a manner of selecting two from three, that is, the special combination is one SIM card and one eSIM. The manner of selecting two from three may lead to the problem of switching between the SIM card and the eSIM card. How to implement an effective switching method has become a hot research topic for major manufacturers. This solution designs reasonable hardware and software configuration, which may realize quickly switching between the physical card and the eSIM, and may also save the state of the eSIM card before powered off, so that the restarted phone may still be automatically restored to the state of the eSIM card before powered off, without manually switching again.

It is understood that there is no terminal device on the market that is configured such technology for switching SIM cards.

In embodiments of the present disclosure, in the power-on state, the switching between the eSIM card and the SIM card is realized, and the restarted mobile phone may be restored to the state of the SIM card before the restart.

In embodiments of the present disclosure, the switching between the eSIM card and the SIM card, and the state of the eSIM card may be automatically restored when restarting.

Figure 16:
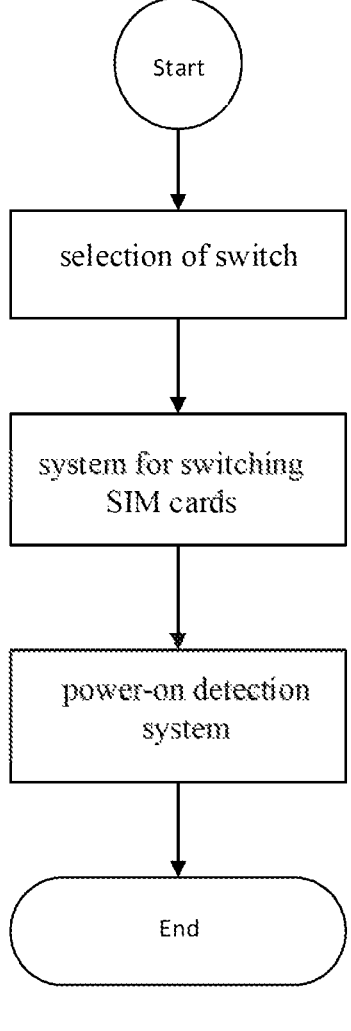
FIG. 16 is a flowchart illustrating a method for controlling a terminal device according to an embodiment of the present disclosure.

Embodiments of the present disclosure may be divided into three parts. A first part is selection of the switch, a general structure of the switch is designed herein, which is convenient for users to select a hardware model that conforms to this solution. A second part is soft logic design for switching, for configuration of the specific switching control mode which may control the switching between the eSIM and the SIM card. A third part is a power-on detection system, for restoring the state of the eSIM card before the shutdown after restarting. Introductions will be made separately below. The overall architecture diagram is shown in FIG. 16.

Figure 17:
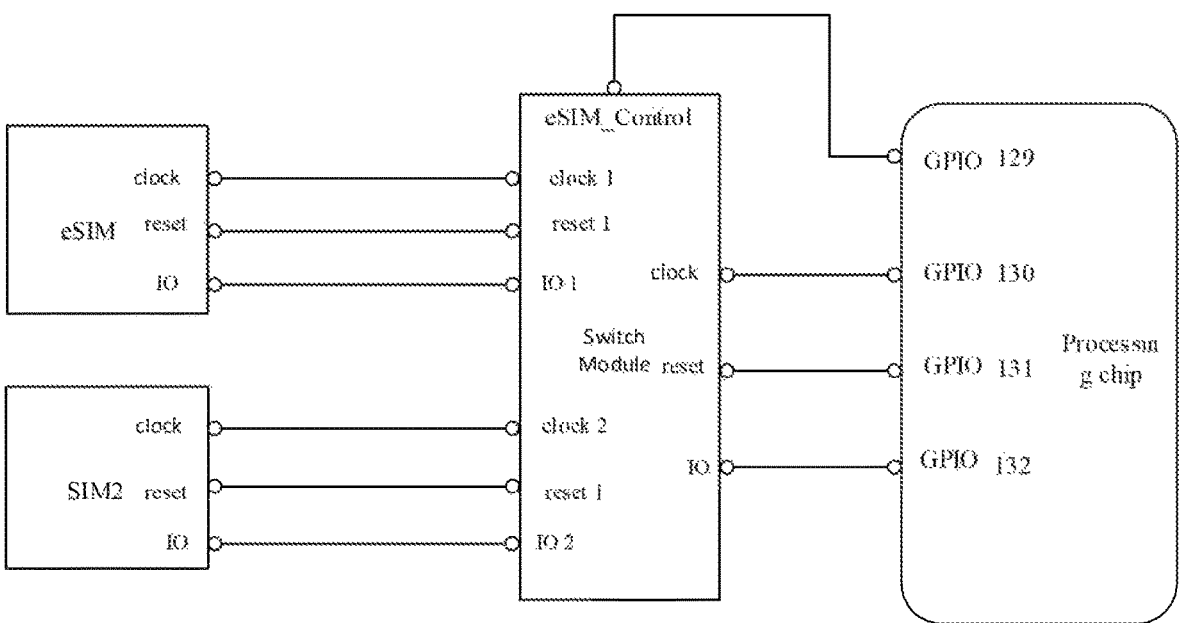
FIG. 17 is a schematic diagram illustrating selection of a switch in a method for controlling a terminal device according to an embodiment of the present disclosure.

In embodiments of the present disclosure, regarding the selection of the switch, a hardware designed according to requirements of software logic. This hardware solution may comprehensively manage and control general-purpose input/output (IO), reset (RST), clock (CLK) pins of the physical SIM card and the corresponding pins eSIM, and finally use a reserved embedded eSIM selection pin (eSIM_Control) to complete whether an underlying chip is connected to the physical SIM card SIM2 or the embedded eSIM card. When the embedded eSIM selection pin is pulled down to a lower level, the clock, reset, and IO pins in the switch module are connected to clock 1, reset 1, and IO1 pins respectively, and the embedded eSIM card is in an enabled state. On the contrary, when the embedded eSIM selection pin is pulled up to a higher level, the clock, reset, and IO pins in the switching module are connected to clock 2, reset 2, and IO2 pins respectively, and the physical SIM card is in the enabled state. The relevant block diagram is shown in FIG. 17. The switch module herein may be expressed by the switch module in the foregoing embodiments. The embedded eSIM selection pin may be expressed by the first control pin in the foregoing embodiments. The embedded eSIM card may be expressed by the first SIM card in the foregoing embodiments. The SIM2 card may be the second SIM card in the foregoing embodiments.

In embodiments of the present disclosure, regarding the system for switching the SIM cards, the embedded eSIM selection pin may be coupled to one of pins of a CPU for control. For example, the GPIO 129 is selected to control the embedded eSIM selection pin to be high or low. Therefore, the switch in the user interface may realize the function of controlling the GPIO 129. When the eSIM is enabled, the GPIO 129 is pulled down to low, and when the embedded eSIM is disabled, the GPIO 129 is pulled up to high. The GPIO 129 may be represented by the foregoing first control output pin, which is indicated by the GPIO 129 in the figure.

Figure 18:
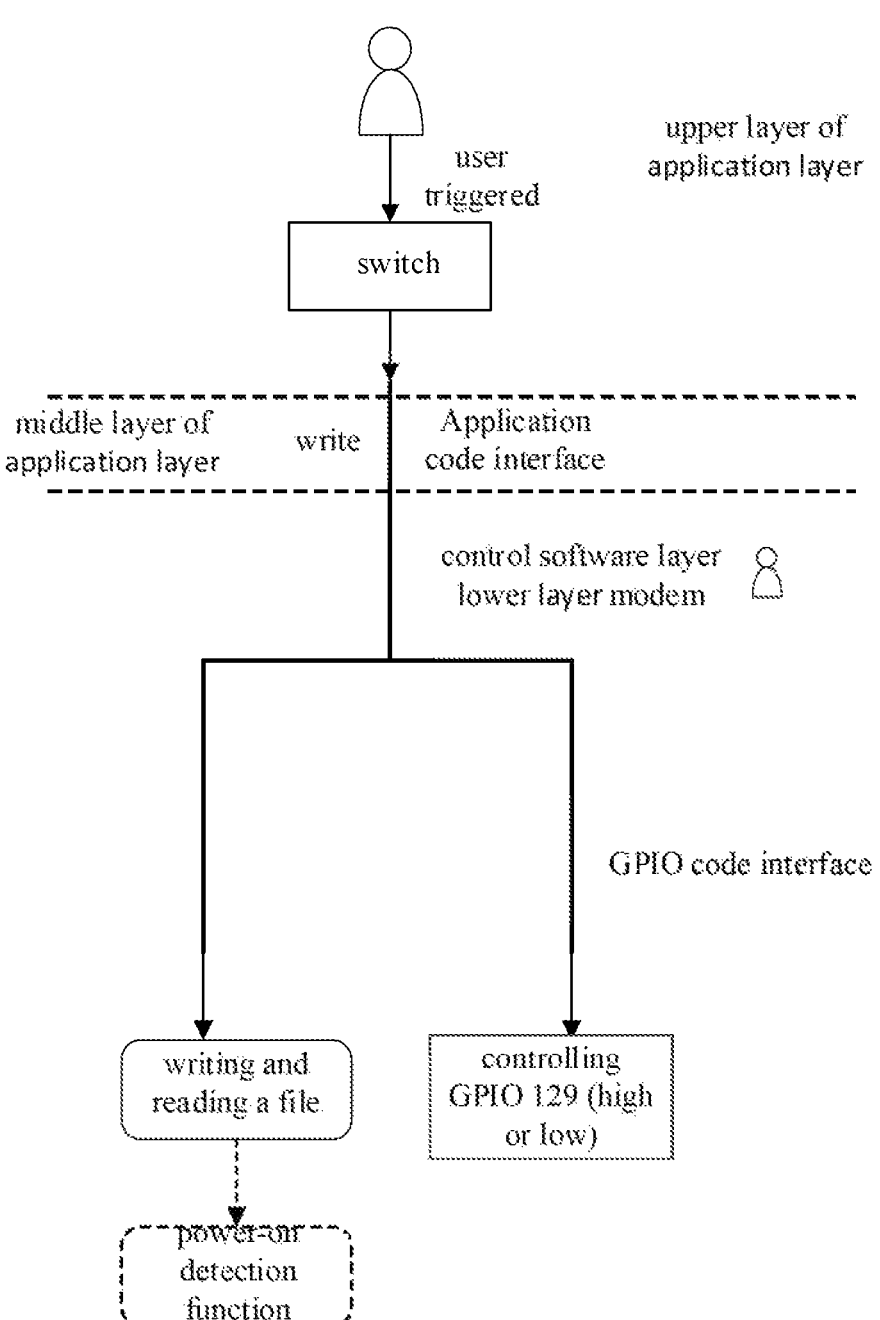
FIG. 18 is a flowchart illustrating implementation of a method for controlling a terminal device according to an embodiment of the present disclosure.

With reference to FIG. 18, the present disclosure provides the following implementation detail.

In an embodiment, after the user triggers an embedded eSIM switch an upper layer sends an instruction to a modem through an application code (QcRilHook.java) interface. After receiving the instruction, the modem calls a read-write code (efs write) interface (fs_task.c) to write a embedded eSIM state as true in a read and write file (efs file), which is configured for a subsequent power-on detection system, and then controls the GPIO 129 to be low through GPIO code (DalTlmm_ConfigGpio) interface. Here, the GPIO code interface may be expressed by the control code interface described above. Here, the read-write file may be expressed by the configuration file of the foregoing embodiments.

In an embodiment, after the user cancels the use of the embedded eSIM card, the upper layer also sends an instruction to the modem through the application code interface. After receiving the instruction, the modem calls the read-write code interface to write the embedded eSIM state as false, and then controls the GPIO 129 to be high through the GPIO code interface.

In embodiments of the present disclosure, regarding the power-on detection system, under normal circumstances, when the mobile phone is restarted, states of all GPIO pins will be reset to their initial values. Therefore, in a case that there is no power-on detection system, when the mobile phone is in the eSIM state before restarting and the GPIO 129 is pulled down to low at this time, the GPIO 129 will be reset to be high by the system after restarting. The eSIM state may be automatically exited after powering on, which is often not expected by the user. For this, the design logic is as follows.

In an embodiment, in the system for switching the SIM cards, each time the user triggers switching, information will be saved in the configuration file, which will not be lost, and may be read when the system is powered on. Therefore, the content in the file may be actively read when the system is powered on.

Figure 19:
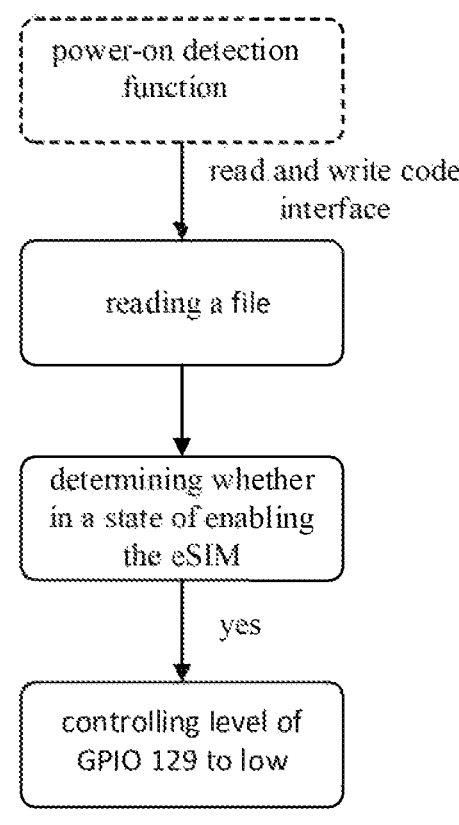
FIG. 19 is a flowchart illustrating implementation of powering on a terminal device in a method for controlling a terminal device according to an embodiment of the present disclosure.

In an embodiment, as shown in FIG. 19, when a value in the configuration file is true, the GPIO 129 will be pulled down to low through the GPIO code interface again, that is, it is switched to the eSIM state. When the value in the configuration file is false, this logic is skipped directly and the device is powered on normally.

Through the above embodiments, flexible switching between the physical SIM card and the embedded eSIM card may be realized, and the function of restoring the SIM state of the terminal before restart is realized after restarting. Therefore, a good use experience is provided for the user.

Figure 20:
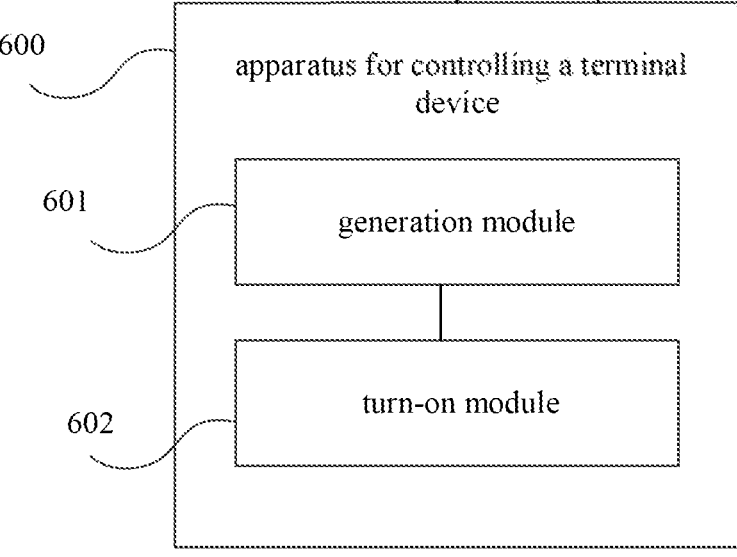
FIG. 20 is a block diagram illustrating an apparatus for controlling a terminal device according to an embodiment of the present disclosure.

With reference to FIG. 20, in an embodiment of the present disclosure, an apparatus 600 controlling a terminal device is provided. The terminal device includes a first SIM card and a second SIM card; the first SIM card is an embedded eSIM card integrated with a processing module of the terminal device, and the second SIM card is a SIM card installed in a SIM card slot of the terminal device. The apparatus 600 includes:

a generation module 601, configured to generate a switching signal;

a turn-on module 602, configured to turn on a path between the processing module and the first SIM card or turn on a path between the processing module and the second SIM card s according to the switching signal.

In an embodiment of the present disclosure, the generation module 601 is further configured to read a configuration file and generate the switching signal according to state information of the first SIM card in the configuration file;

or, generate the switching signal in response to detecting an operation instruction for the first SIM card or the second SIM card via a user interface (UI).

In an embodiment of the present disclosure, the generation module 601 is further configured to:

generate a first level signal in response to the state information of the first SIM card indicating enabling the first SIM card, in which the first level signal is configured to turn on a path between the processing module and the first SIM card; or generate a second level signal in response to the state information of the first SIM card indicating disabling the first SIM card, in which the second level signal is configured to turn on a path between the processing module and the second SIM card.

In an embodiment of the present disclosure, the generation module 601 is further configured to:

read the configuration file after the terminal device is powered on.

Figure 21:
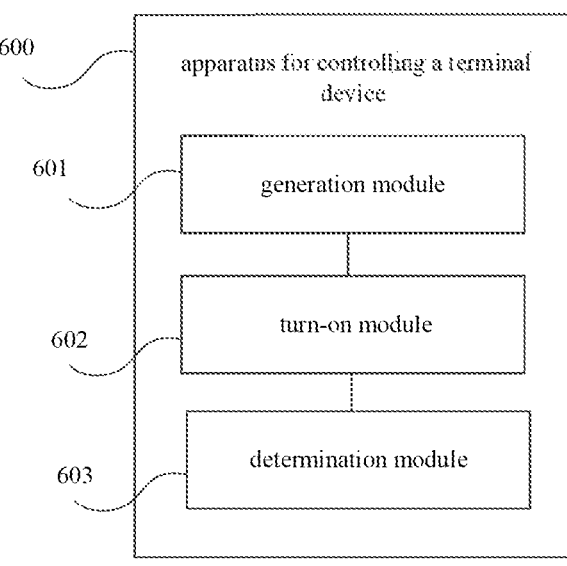
FIG. 21 is a block diagram illustrating an apparatus for controlling a terminal device according to an embodiment of the present disclosure.

With reference to FIG. 21, in an embodiment of the present disclosure, the apparatus 600 further includes:

a determination module 603, configured to determine the state information of the first SIM card in the configuration file according to an operation instruction for the first SIM card or the second SIM card.

In an embodiment of the present disclosure, the generation module 601 is further configured to:

generate a first level signal in response to the operation instruction instructing enabling the first SIM card and/or disabling the second SIM card, in which the first level signal is configured to turn on the path between the processing module and the first SIM card; or generate a second level signal in response to the operation instruction instructing disabling the first SIM card and/or enabling the second SIM card, in which the second level signal is configured to turn on the path between the processing module and the second SIM card.

Figure 22:
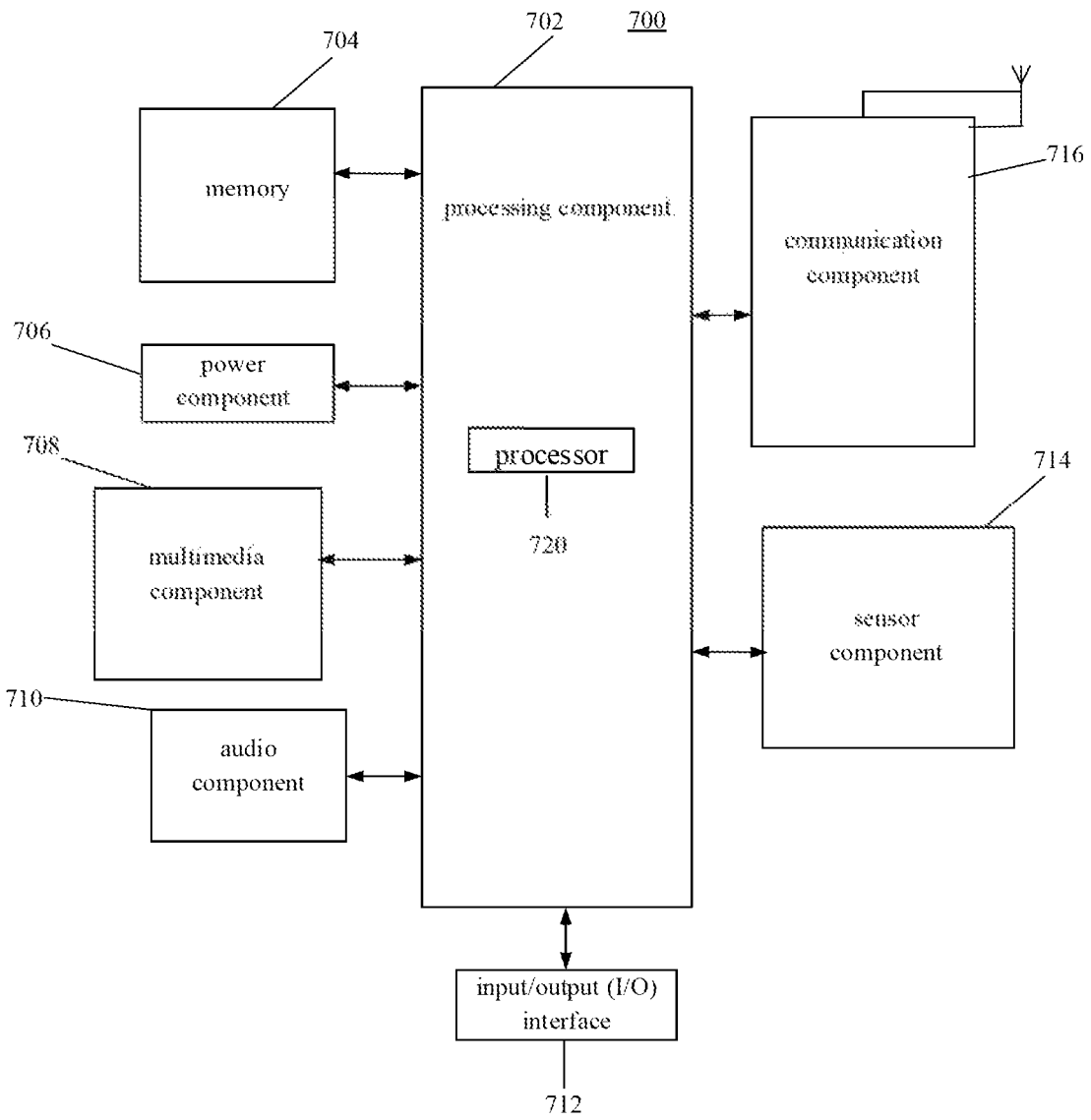
FIG. 22 is a block diagram illustrating an electronic device according to an embodiment of the present disclosure.

With reference to FIG. 22, in an embodiment of the present disclosure, an electronic device 700 is provided. The electronic deice 700 includes:

a memory 704 for storing processor executable instructions;

a processor 720 coupled with the memory 704;

in which, the processor 720 is configured to execute the method for controlling the terminal device according to any one of the foregoing technical solutions.

FIG. 22 is a block diagram of an electronic device according to an embodiment of the present disclosure. For example, the device 700 may be a mobile phone, a computer, a digital broadcast terminal device, a messaging device, a game console, a tablet device, a medical device, an exercise device, a personal digital assistant, and so on.

Referring to FIG. 22, the electronic device 700 may include one or more of the following components: a processing component 702, a memory 704, a power component 706, a multimedia component 708, an audio component 710, an input/output (I/O) interface 712, a sensor component 714, and a communication component 716.

The processing component 702 normally controls the overall operation (such as operations associated with displaying, telephone calls, data communications, camera operations and recording operations) of the device 700. The processing component 702 may include one or a plurality of processors 720 to execute instructions to perform all or part of the steps of the above described method. In addition, the processing component 702 may include one or a plurality of units to facilitate interactions between the processing component 702 and other components. For example, the processing component 702 may include a multimedia unit to facilitate interactions between the multimedia component 708 and the processing component 702.

The memory 704 is configured to store various types of data to support operations at the device 700. Examples of such data include instructions for an application or method operated on the device 700, contact data, phone book data, messages, images, videos and the like. The memory 704 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 706 provides power to various components of the device 700. The power component 706 may include a power management system, one or a plurality of power sources and other components associated with power generation, management, and distribution of the device 700.

The multimedia component 708 includes a screen that provides an output interface between the device 700 and the user. In some embodiments, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures an the touch panel. The touch sensor may sense not only the boundary of the touches or sliding actions, but also the duration and pressure related to the touches or sliding operations. In some embodiments, the multimedia component 708 includes a front camera and/or a rear camera. When the device 700 is in an operation mode such as a shooting mode or a video mode, the front camera and/or the rear camera may receive external multimedia data. Each front camera and rear camera may be a fixed optical lens system or have a focal length and an optical zoom capability.

The audio component 710 is configured to output a and/or input an audio signal. For example, the audio component 710 includes a microphone (MIC) that is configured to receive an external audio signal when the device 700 is in an operation mode such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and a peripheral interface unit. The peripheral interface unit may be a keyboard, a click wheel, a button and so on. These buttons may include, but not limited to, a home button, a volume button, a start button, and a locking button.

The sensor assembly 714 includes one or a plurality of sensors for providing the device with various aspects of state assessments. For example, the sensor component 714 may detect an ON/OFF state of the device 700 and a relative positioning of the components. For example, the components may be a display and a keypad of the device 700. The sensor component 714 may also detect a change in position of the device 700 or a component of the device 700, the presence or absence of contact of the user with the device 700, the orientation or acceleration/deceleration of the device 700 and a temperature change of the device 700. The sensor component 714 may include a proximity sensor configured to detect the presence of nearby objects without any physical contact. The sensor component 714 may also include a light sensor (such as a CMOS or a CCD image sensor) for use in imaging applications. In some embodiments, the sensor component 714 may further include an acceleration sensor, a gyro sensor, a magnetic sensor, a pressure sensor, or a temperature sensor.

The communication component 716 is configured to facilitate wired or wireless communication between the device 700 and other devices. The device 700 may access a wireless network based on a communication standard such as Wi-Fi, 2G, 3G, 4G, or 5G, or a combination thereof. In some exemplary embodiments; the communication component 716 receives broadcast signals or broadcast-associated information from an external broadcast management system via a broadcast channel. In some exemplary embodiments, the communication component 716 further includes a Dear field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology and other technologies.

In some exemplary embodiments, the device 700 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, to perform the above method.

In some embodiments of the present disclosure, there is also provided a non-transitory computer readable storage medium including instructions, such as a memory 704 including instructions. The instructions are executable by the processor 720 of the device 700 to perform the above method. For example, the non-transitory computer readable storage medium may be a ROM, a random access memory (RAM), a CD-ROM, a magnetic tape, a floppy disk, an optical data storage device, etc.

Embodiments of the present disclosure provide a non-transitory computer-readable storage medium which causes a computer to execute the method for controlling the terminal device described in one or more of the foregoing technical solutions when instructions in the storage medium are executed by a processor of the computer.

When executing the instructions, the processor may perform at least the following:

generating a switching signal; and turning on a path between the processing module and the first SIM card or turning on a path between the processing module and the second SIM card s according to the switching signal.

In an embodiment, generating the switching signal includes:

reading a configuration file and generating the switching signal according to state information of the first SIM card in the configuration file;

or, generating the switching signal in response to detecting an operation instruction for the first SIM card, or the second SIM card via a user interface (UI).

In an embodiment, generating the switching signal according to the state information of the first SIM card in the configuration file includes:

generating a first level signal in response to the state information of the first SIM card indicating enabling the first SIM card, in which the first level signal is configured to turn on a path between the processing module and the first SIM card; or generating a second level signal in response to the state information of the first SIM card indicating disabling the first SIM card, in which the second level signal is configured to turn on a path between the processing module and the second SIM card.

In an embodiment, reading the configuration file includes:

reading the configuration file after the terminal device is powered on.

In an embodiment, the method further includes:

determining the state information of the first SIM card in the configuration file according to an operation instruction for the first SIM card or the second SIM card.

In an embodiment, generating the switching signal in response to the operation instruction for the first SIM card or the second SIM card which is detected via the user interface UI includes:

generating a first level signal in response to the operation instruction instructing enabling the first SIM card and/or disabling the second SIM card, in which the first level signal is configured to turn on the path between the processing module and the first SIM card; or generating a second level signal in response to the operation instruction instructing disabling the first SIM card and/or enabling the second SIM card, in which the second level signal is configured to turn on the path between the processing module and the second SIM card.

In an embodiment, the method futher includes:

generating a control signal according to which of the first SIM card and the second SIM card which is in an operating state;

outputting a control signal to the switch module, in which the control signal is configured to control the switch module to output a first operating voltage or a second operating voltage to the first SIM card or the second SIM card.

Other embodiments of the present disclosure will be apparent to those skilled in the art after considering the specification and practicing the present disclosure disclosed herein. The present disclosure is intended to cover any variations, uses or adaptive changes of the present disclosure, which are in accordance with general principles of the present disclosure and include common knowledge or technical means in the art that are not disclosed herein. The specification and embodiments are to be regarded as illustrative only, and the real scope and spirit of the present disclosure are pointed out in the attached claims.

It should be understood that the present disclosure is not limited to the precise structures described above and illustrated in the drawings, and various modifications and changes may be made without departing from the scope thereof. The scope of the present disclosure is merely limited by the attached claims.

The invention claimed is:

1. A switch module, comprising:
a set of first-class pins configured to couple with a processing module;
two sets of second-class pins, in which a first set of second-class pins is configured to couple with a first subscriber identification module (SIM) card, and a second set of second-class pins is configured to couple with a second SIM card;
a first control pin configured to couple with a control output pin of the processing module and receive a switching signal; and
a switch circuit, respectively coupled with the first control pin, the first-class pins and the two sets of second-class pins, wherein the switch circuit is configured to turn on a path between the first-class pins and the first set of second-class pins or a path between the first-class pins and the second set of second-class pins according to the switching signal, to enable switching between the first SIM card and the second SIM card;
wherein the first-class pins comprise a first power supply pin configured to provide a first operating voltage with a first level;
the two sets of second-class pins each comprises a second power supply pin;
wherein the switch module further comprises:
a voltage conversion circuit coupled with the first power supply pin, and at least configured to, convert the first operating voltage with the first level into a second operating voltage with a second level; wherein the second level is different from the first level;
wherein when the switch circuit turns on the path between the first-class pins and the first set of second-class pins, the first power supply pin in the first-class pins is coupled with the second power supply pin in the first set of second-class pins via the voltage conversion circuit, and the voltage conversion circuit is configured to output the second operating voltage through the second power supply pin in the first set of second-class pins, and the second power supply pin in the second set of second-class pins is disconnected from the voltage conversion circuit or the first power supply pin;
when the switch circuit turns on the path between the first-class pins and the second set of second-class pins, the second power supply pin in the second set of second-class pins is coupled with the voltage conversion circuit or the first power supply pin, and the voltage conversion circuit is disconnected from the second power supply pin in the first set of second-class pins.

2. The switch module according to claim 1, wherein,
the switch circuit is configured to turn on the path between the first-class pins and the first set of second-class pins and turn off the path between the first-class pins and the second set of second-class pins when the switching signal is a first level signal; or the switching circuit is configured to turn on the path between the first-class pins and the second set of second-class pins and turn off the path between the first-class pins and the first set of second-class pins when the switching signal is a second level signal.

3. The switch module according to claim 1, wherein the first-class pins comprise:
a first clock pin configured to provide a clock signal to the first SIM card or the second SIM card;
a first reset pin configured to provide a reset signal to the first SIM card or the second SIM card; and
a first input-output (IO) pin configured to transmit an IO signal between the processing module and the first SIM card or between the processing module and the second SIM card.

4. The switch module according to claim 1, wherein the set of second-class pins comprises:
a second clock pin configured to provide a clock signal to the first SIM card or the second SIM card;
a second reset pin configured to provide a reset signal to the first SIM card or the second SIM card; and
a second IO pin configured to transmit an IO signal between the first SIM card and the processing module or between the second SIM card and the processing module.

5. The switch module according to claim 1, further comprising:
a second control pin configured to receive a control signal, wherein the control signal is configured to control the second power supply pin in the second set of second-class pins to output the first operating voltage or the second operating voltage when the switch circuit turns on the path between the first-class pins and the second set of second-class pins;
a controlled switch comprising an output end and an input end, wherein the output end is coupled with the second power supply pin in the second set of second-class pins, and the input end is configured to couple with an output end of the voltage conversion circuit or with the first-class pins according to the control signal;
wherein when the switch circuit turns on the path between the first-class pins and the second set of second-class pins, and the input end of the controlled switch is coupled with the voltage conversion circuit, the voltage conversion circuit is coupled with the second power supply pin in the second set of second-class pins, and configured to output the second operating voltage through the second power supply pin in the second set of second-class pin.

6. A terminal device, comprising:
a processing module;
a first subscriber identification module (SIM) card integrated with the processing module;
a SIM card slot for installing a second SIM card;
a switch module, respectively coupled with the processing module, the first SIM card and the second SIM card;
wherein the switch module comprises:
a set of first-class pins configured to couple with the processing module;
two sets of second-class pins, in which a first set of second-class pins is configured to couple with the firs SIM card, and a second set of second-class pins is configured to couple with the second SIM card;
a first control pin configured to couple with a control output pin of the processing module and receive a switching signal; and a switch circuit, respectively coupled with the first control pin, the first-class pins and the two sets of second-class pins, wherein the switch circuit is configured to turn on a path between the first-class pins and the first set of second-class pins or a path between the first-class pins and the second set of second-class pins according to the switching signal, so as to enable switching between the first SIM card and the second SIM card;

wherein the first-class pins comprise a first power supply pin configured to provide a first operating voltage with a first level;

the two sets of second-class pins each comprises a second power supply pin;

wherein the switch module further comprises:

a voltage conversion circuit coupled with the first power supply pin, and at least configured to, convert the first operating voltage with the first level into a second operating voltage with a second level; wherein the second level is different from the first level;

wherein when the switch circuit turns on the path between the first-class pins and the first set of second-class pins, the first power supply pin in the first-class pins is coupled with the second power supply pin in the first set of second-class pins via the voltage conversion circuit, and the voltage conversion circuit is configured to output the second operating voltage through the second power supply pin in the first set of second-class pins, and the second power supply pin in the second set of second-class pins is disconnected from the voltage conversion circuit or the first power supply pin;

when the switch circuit turns on the path between the first-class pins and the second set of second-class pins, the second power supply pin in the second set of second-class pins is coupled with the voltage conversion circuit or the first power supply pin, and the voltage conversion circuit is disconnected from the second power supply pin in the first set of second-class pins.

7. The terminal device according to claim 6, wherein the processing module further comprises:

a first control output pin coupled with the first control pin of the switch module and output the switching signal; wherein, the switching signal is configured to selectively control any set of second-class pins coupled with first-class pins of the switch module.

8. The terminal device according to claim 6, wherein the processing module further comprises:

a set of third-class pins configured to couple with the switch module.

9. The terminal device according to claim 8, wherein the third-class pins are general-purpose input/output (GPIO) pins.

10. The terminal device according to claim 9, wherein the third-class pins comprise:

a third clock pin, coupled with a first clock pin of the switch module, and configured to provide a clock signal to the first SIM card or the second SIM card through the first clock pin;

a third reset pin, coupled with a first reset pin of the switch module, and configured to provide a reset signal to the first SIM card or the second SIM card through the first reset pin;

a third IO pin, coupled with a first IO pin of the switch module, and configured to provide an IO signal to the first SIM card or the second SIM card through the first IO pin.

11. The terminal device according to claim 8, wherein the third-class pins further comprise:

a third power supply pin, coupled with a first power supply pin of the switch module, and configured to provide a first operating voltage with a first level to the first power supply pin.

12. The terminal device according to claim 8, wherein the processing module further comprises:

a second control output pin coupled with a second control pin of the switch module, and configured to output a control signal, wherein, the control signal is configured to control to output a first operating voltage or a second operating voltage to the second SIM card.

13. A method for controlling a terminal device, wherein the terminal device comprises a first subscriber identification module (SIM) card, a second SIM card, and a switch module respectively coupled with the first SIM card and the second SIM card, the method comprises:

generating a switching signal; and turning on, by the switch module, a path between the processing module and the first SIM card or a path between the processing module and the second SIM card according to the switching signal;

wherein the switch module comprises:

a set of first-class pins configured to couple with the processing module;

two sets of second-class pins, in which a first set of second-class pins is configured to couple with the first SIM card, and a second set of second-class pins is configured to couple with the second SIM card;

a first control pin configured to couple with a control output pin of the processing module and receive the switching signal; and a switch circuit, respectively coupled with the first control pin, the first-class pins and the two sets of second-class pins, wherein the switch circuit is configured to turn on a path between the first-class pins and the first set of second-class pins or a path between the first-class pins and the second set of second-class pins according to the switching signal, so as to enable switching between the first SIM card and the second SIM card;

wherein the first-class pins comprise a first power supply pin configured to provide a first operating voltage with a first level;

the two sets of second-class pins each comprises a second power supply pin;

wherein the switch module further comprises:

a voltage conversion circuit coupled with the first power supply pin, and at least configured to, convert the first operating voltage with the first level into a second operating voltage with a second level; wherein the second level is different from the first level;

wherein when the switch circuit turns on the path between the first-class pins and the first set of second-class pins, the first power supply pin in the first-class pins is coupled with the second power supply pin in the first set of second-class pins via the voltage conversion circuit, and the voltage conversion circuit is configured to output the second operating voltage through the second power supply pin in the first set of second-class pins, and the second power supply pin in the second set of second-class pins is disconnected from the voltage conversion circuit or the first power supply pin;

when the switch circuit turns on the path between the first-class pins and the second set of second-class pins, the second power supply pin in the second set of second-class pins is coupled with the voltage conversion circuit or the first power supply pin, the voltage conversion circuit is disconnected from the second power supply pin in the first set of second-class pins.

14. The method according to claim 13, wherein generating the switching signal comprises:

reading a configuration file and generating the switching signal according to state information of the first SIM card in the configuration file;

or, generating the switching signal in response to detecting an operation instruction for the first SIM card or the second SIM card via a user interface (UI).

15. The method according to claim 14, wherein generating the switching signal according to the state information of the first SIM card in the configuration file comprises:

generating a first level signal in response to the state information of the first SIM card indicating enabling the first SIM card, wherein the first level signal is configured to turn on a path between the processing module and the first SIM card; or generating a second level signal in response to the state information of the first SIM card indicating disabling the first SIM card, wherein the second level signal is configured to turn on a path between the processing module and the second SIM card.

16. The method according to claim 14, wherein reading the configuration file comprises:

reading the configuration file after the terminal device is powered on.

17. The method according to claim 14, wherein generating the switching signal in response to detecting the operation instruction for the first SIM card or the second SIM card via the user interface (UI) comprises:

generating a first level signal in response to the operation instruction instructing enabling the first SIM card and/ or disabling the second SIM card, wherein the first level signal is configured to turn on the path between the processing module and the first SIM card; or generating a second level signal in response to the operation instruction instructing disabling the first SIM card and/or enabling the second SIM card, wherein the second level signal is configured to turn on the path between the processing module and the second SIM card.

18. The method according to claim 13, further comprising:

determining state information of the first SIM card in a configuration file according to an operation instruction for the first SIM card or the second SIM card.

19. The method according to claim 13, further comprising:

generating a control signal according to which of the first SIM card and the second SIM card which is in an operating state;

outputting a control signal to the switch module, wherein the control signal is configured to control the switch module to output a first operating voltage or a second operating voltage to the first SIM card or the second SIM card.

* * * * *